US009583142B1

(12) United States Patent
Zhu et al.

(10) Patent No.: US 9,583,142 B1
(45) Date of Patent: Feb. 28, 2017

(54) SOCIAL MEDIA PLATFORM FOR CREATING AND SHARING VIDEOS

(71) Applicant: MUSICAL.LY INC., San Francisco, CA (US)

(72) Inventors: Jun Zhu, Shanghai (CN); Bingjun Zhou, San Jose, CA (US); Luyu Yang, Shanghai (CN)

(73) Assignee: MUSICALLY INC., San Francisco, CA (US)

( * ) Notice: Subject to any disclaimer, the term of this patent is extended or adjusted under 35 U.S.C. 154(b) by 0 days.

(21) Appl. No.: 15/207,403

(22) Filed: Jul. 11, 2016

Related U.S. Application Data

(60) Provisional application No. 62/190,976, filed on Jul. 10, 2015.

(51) Int. Cl.
| | |
|---|---|
| H04N 5/93 | (2006.01) |
| G11B 27/034 | (2006.01) |
| G11B 27/34 | (2006.01) |
| H04N 21/81 | (2011.01) |
| H04N 21/8549 | (2011.01) |
| H04N 21/4788 | (2011.01) |
| H04N 21/414 | (2011.01) |
| H04N 21/475 | (2011.01) |
| H04N 21/2743 | (2011.01) |

(52) U.S. Cl.
CPC .......... *G11B 27/034* (2013.01); *G11B 27/34* (2013.01); *H04N 21/2743* (2013.01); *H04N 21/41407* (2013.01); *H04N 21/4756* (2013.01); *H04N 21/4788* (2013.01); *H04N 21/8173* (2013.01); *H04N 21/8549* (2013.01)

(58) Field of Classification Search
CPC ... G11B 27/034; G11B 27/34; H04N 21/8173; H04N 21/8549; H04N 21/4788; H04N 21/41407; H04N 21/4756; H04N 21/2743
USPC ....... 386/282, 285, 263, 264, 321, 338, 340, 386/339, 278
See application file for complete search history.

(56) References Cited

U.S. PATENT DOCUMENTS

| | | |
|---|---|---|
| D621,845 S | 8/2010 | Anzures et al. |
| D626,134 S | 10/2010 | Chaudhri |
| D640,269 S | 6/2011 | Chen |
| D657,375 S | 4/2012 | Kim et al. |
| 8,171,419 B2 | 5/2012 | Mujkic et al. |
| D696,676 S | 12/2013 | Seo |
| D706,795 S | 6/2014 | Andersson et al. |
| 8,811,948 B2 | 8/2014 | Bandyopadhyay et al. |

(Continued)

OTHER PUBLICATIONS

Co-pending U.S. Appl. No. 29/534,246, filed Jul. 27, 2015.

(Continued)

*Primary Examiner* — Robert Chevalier
(74) *Attorney, Agent, or Firm* — Wilson, Sonsini, Goodrich & Rosati

(57) ABSTRACT

Systems, media, methods, and platforms providing video processing for generating and sharing lip-sync videos comprising: presenting an interface allowing a user to select audio content; presenting an interface allowing a user to capture video content; presenting an interface allowing a user to synchronize the audio content with the video content; synthesizing the video content and the audio content to generate a new lip-sync video; automatically sharing the lip-sync video to a social media platform; and providing a lip-sync video feed within a social network.

25 Claims, 34 Drawing Sheets

(56) References Cited

U.S. PATENT DOCUMENTS

| | | | |
|---|---|---|---|
| D716,830 S | 11/2014 | Hwang et al. | |
| D727,353 S | 4/2015 | Yokota et al. | |
| D727,930 S | 4/2015 | Kim et al. | |
| D727,931 S | 4/2015 | Kim et al. | |
| D729,266 S | 5/2015 | Xu et al. | |
| D732,062 S | 6/2015 | Kwon | |
| D732,065 S | 6/2015 | Roberts et al. | |
| D733,731 S | 7/2015 | Kim | |
| D736,808 S | 8/2015 | Soegiono et al. | |
| D736,815 S | 8/2015 | Niijima et al. | |
| D737,295 S | 8/2015 | Jung et al. | |
| D737,835 S | 9/2015 | Jung et al. | |
| D742,392 S | 11/2015 | Cho | |
| 9,178,773 B1 | 11/2015 | Tassone et al. | |
| D744,505 S | 12/2015 | Wilberding et al. | |
| D749,097 S | 2/2016 | Zou et al. | |
| D751,090 S | 3/2016 | Hu et al. | |
| D752,605 S | 3/2016 | Wang | |
| D753,139 S | 4/2016 | Bovet | |
| D753,151 S | 4/2016 | Lee et al. | |
| D753,676 S | 4/2016 | Oh et al. | |
| 2007/0085575 A1* | 4/2007 | Cooper | H04N 5/04 327/108 |
| 2010/0087230 A1 | 4/2010 | Peh et al. | |
| 2010/0299634 A1 | 11/2010 | Cho et al. | |
| 2011/0230987 A1 | 9/2011 | Anguera et al. | |
| 2012/0071238 A1 | 3/2012 | Bala et al. | |
| 2012/0086855 A1 | 4/2012 | Xu et al. | |
| 2012/0254649 A1 | 10/2012 | Vonog et al. | |
| 2013/0008301 A1 | 1/2013 | Naik et al. | |
| 2013/0163963 A1* | 6/2013 | Crosland | H04N 9/8211 386/285 |
| 2013/0276620 A1 | 10/2013 | Uehara et al. | |
| 2013/0305189 A1 | 11/2013 | Kim | |
| 2013/0326361 A1 | 12/2013 | Kendal | |
| 2013/0343729 A1 | 12/2013 | Rav-Acha et al. | |
| 2014/0078022 A1 | 3/2014 | Dusterhoff | |
| 2014/0149905 A1 | 5/2014 | Woo et al. | |
| 2014/0161412 A1 | 6/2014 | Chase et al. | |
| 2014/0173439 A1 | 6/2014 | Gutierrez et al. | |
| 2014/0184471 A1 | 7/2014 | Martynov et al. | |
| 2015/0010291 A1 | 1/2015 | Muller | |
| 2015/0081207 A1 | 3/2015 | Briant | |
| 2015/0106103 A1 | 4/2015 | Fink, IV | |
| 2015/0121177 A1 | 4/2015 | Iida et al. | |
| 2015/0143248 A1 | 5/2015 | Beechuk et al. | |
| 2015/0149952 A1 | 5/2015 | Baheti et al. | |
| 2015/0149967 A1 | 5/2015 | Bernstein et al. | |
| 2015/0156552 A1 | 6/2015 | Wayans et al. | |
| 2015/0172534 A1 | 6/2015 | Miyakawa et al. | |
| 2015/0177903 A1 | 6/2015 | Kim et al. | |
| 2015/0177946 A1 | 6/2015 | Lim | |
| 2015/0248200 A1 | 9/2015 | Cho et al. | |
| 2016/0092076 A1 | 3/2016 | Yenigalla et al. | |
| 2016/0103574 A1 | 4/2016 | Kankaanpää | |
| 2016/0103650 A1 | 4/2016 | Lim et al. | |
| 2016/0110152 A1 | 4/2016 | Choi et al. | |

OTHER PUBLICATIONS

Co-pending U.S. Appl. No. 29/534,247, filed Jul. 27, 2015.
Co-pending U.S. Appl. No. 29/534,248, filed Jul. 27, 2015.
U.S. Appl. No. 29/534,248 Office Action dated Jul. 22, 2016.
U.S. Appl. No. 29/534,248 Office Action dated May 19, 2016.

* cited by examiner

SOCIAL MEDIA PLATFORM FOR CREATING AND SHARING VIDEOS

CROSS-REFERENCE TO RELATED APPLICATIONS

This application claims the benefit of U.S. provisional application Ser. No. 62/190,976 filed Jul. 10, 2015, the entire contents of which are hereby incorporated by reference.

BACKGROUND OF THE INVENTION

Video websites and services have developed from the age of YouTube to the instant age of self-centric video services like Instagram and Vine. However, there exists a long-felt need to allow users to more freely express themselves and to have better sense of a community.

SUMMARY OF THE INVENTION

Existing video services each have various shortcomings. For example, some do not provide a social network and require the user to post their content on third-party social media platforms. Others fail to provide lip-sync video creation capabilities. All fail to provide an ideal combination of free expression in creating lip-sync videos and a sense of community.

The application described herein is a service and social media platform for creating and sharing short videos; it is very much a social app, with the ability to follow, like, and comment on user's video creations which are called "musicals." Users are provided with the ability to record multiple clips that are spliced together to transition from one scene to the next. A user is provided with interfaces allowing them to record or import video content as well as interfaces that allow them edit the video and select and synchronize audio. Alternatively, the user is provided with interfaces allowing them to select audio and then add video content. The subject matter herein includes a social network including features allowing influencers to issue video challenges and respond to comments via video and allowing users to create duets with other video authors.

The application described herein is configured to allow a user to automatically share lip-sync videos to a social media platform. It presents an interface allowing users to synchronize audio content with video content by freely selecting an audio start point with regard to the video. The application described herein also provides tools to allow users to configure the speed of the video, add filters, and elect to play the video backwards. Moreover, the application described herein delivers an instant video experience that lets users take part in challenges and contests and follow other users, musicians, and celebrities as a way to get started. Users optionally use these features to create instant music videos that combine a variety of effects and lip-sync voice over. The application described herein further provides an outlet for creative expression and communication by offering tools to create duet videos, Q&A videos, challenges and contests, as well as live streaming videos.

In one aspect, disclosed herein are computer-implemented systems comprising: a digital processing device comprising: at least one processor, an operating system configured to perform executable instructions, a memory, and a computer program including instructions executable by the digital processing device to create a video processing application for generating and sharing lip-sync videos comprising: a software module presenting an interface allowing a user to select audio content; a software module presenting an interface allowing a user to capture video content; a software module presenting an interface allowing a user to synchronize the audio content with the video content; a software module synthesizing the video content and the audio content to generate a new lip-sync video; a software module automatically sharing the lip-sync video to a social media platform; and a software module providing a lip-sync video feed, the feed comprising a plurality of lip-sync videos, the feed identifying the author of each lip-sync video, the feed comprising tools to allow the user to comment on each lip-sync video and mark each lip-sync video as a favorite. In some embodiments, each lip-sync video is less than 20 seconds in length, less than 15 seconds in length, or less than 10 seconds in length. In some embodiments, the interface allowing a user to select audio content allows the user to select audio content from: a streaming audio track, a pre-existing audio file archived on the digital processing device, and a pre-existing lip-sync video. In some embodiments, the interface allowing a user to capture video content allows the user to capture video content from: a live video stream, a video captured in real-time using the digital processing device, or a pre-existing video file archived on the digital processing device. In some embodiments, the interface allowing a user to select audio content comprises tools allowing the user to edit the audio content. In further embodiments, the editing comprises modification of the speed of the audio content, modification of one or both of the end points of the audio content, and modification of the volume of the audio content. In still further embodiments, the editing comprises mixing the audio content with one or more distinct audio contents. In some embodiments, the interface allowing a user to capture video content comprises tools allowing the user to edit the video content. In further embodiments, the editing comprises modification of the speed of the video content and application of one or more color filters to the video content. In some embodiments, the feed is a featured content feed, a followed-user feed, or a location-based feed. In some embodiments, the user selects audio prior to capturing video. In other embodiments, the user captures video prior to selecting audio. In some embodiments, the software module presenting an interface allowing a user to synchronize the audio content with the video content comprises tools allowing the user to select a start point. In further embodiments, the start point is selected by the user via touchscreen wipe gesture. In some embodiments, the software module synthesizing the video content and the audio content generates the lip-sync video on the digital processing device using the resources of the at least one processor and the memory. In some embodiments, the application further comprises a software module presenting an interface allowing a user to create a duet video, the interface comprising tools allowing the user to select a pre-existing lip-sync video, wherein the pre-existing lip-sync video is integrated with captured video to create a new duet video. In some embodiments, the application further comprises a software module presenting an interface allowing a user to capture video content in response to a user comment. In some embodiments, the new lip-sync video is a music video, a dance video, a comedy video, a sports video, a fashion video, a make-up video, or a work-out video. In some embodiments, each lip-sync video is full screen. In further embodiments, the feed is browsed by the user via touchscreen wipe gesture. In some embodiments, the application further comprises a software module presenting an interface allowing a user to create a challenge for other users to generate and upload lip-sync videos for one or more selected audio contents within a given time. In further embodiments, one or more winners are chosen for the best lip-sync videos and prizes are rewarded to the one or more winners. In some embodiments, the application further comprises a software module presenting an interface allowing a user to participate in challenges of generating lip-sync videos for a selected audio content.

In another aspect, disclosed herein are non-transitory computer-readable storage media encoded with a computer program including instructions executable by a processor to create a video processing application for generating and sharing lip-sync videos comprising: a software module presenting an interface allowing a user to select audio content; a software module presenting an interface allowing a user to capture video content; a software module presenting an interface allowing a user to synchronize the audio content with the video content; a software module synthesizing the video content and the audio content to generate a new lip-sync video; a software module automatically sharing the lip-sync video to a social media platform; and a software module providing a lip-sync video feed, the feed comprising a plurality of lip-sync videos, the feed identifying the author of each lip-sync video, the feed comprising tools to allow the user to comment on each lip-sync video and mark each lip-sync video as a favorite. In some embodiments, each lip-sync video is less than 20 seconds in length, less than 15 seconds in length, or less than 10 seconds in length. In some embodiments, the interface allowing a user to select audio content allows the user to select audio content from: a streaming audio track, a pre-existing audio file archived on the digital processing device, and a pre-existing lip-sync video. In some embodiments, the interface allowing a user to capture video content allows the user to capture video content from: a live video stream, a video captured in real-time using the digital processing device, or a pre-existing video file archived on the digital processing device. In some embodiments, the interface allowing a user to select audio content comprises tools allowing the user to edit the audio content. In further embodiments, the editing comprises modification of the speed of the audio content, modification of one or both of the end points of the audio content, and modification of the volume of the audio content. In still further embodiments, the editing comprises mixing the audio content with one or more distinct audio contents. In some embodiments, the interface allowing a user to capture video content comprises tools allowing the user to edit the video content. In further embodiments, the editing comprises modification of the speed of the video content and application of one or more color filters to the video content. In some embodiments, the feed is a featured content feed, a followed-user feed, or a location-based feed. In some embodiments, the user selects audio prior to capturing video. In other embodiments, the user captures video prior to selecting audio. In some embodiments, the software module presenting an interface allowing a user to synchronize the audio content with the video content comprises tools allowing the user to select a start point. In further embodiments, the start point is selected by the user via touchscreen wipe gesture. In some embodiments, the software module synthesizing the video content and the audio content generates the lip-sync video on the digital processing device using the resources of the at least one processor and the memory. In some embodiments, the application further comprises a software module presenting an interface allowing a user to create a duet video, the interface comprising tools allowing the user to select a pre-existing lip-sync video, wherein the pre-existing lip-sync video is integrated with captured video to create a new duet video. In some embodiments, the application further comprises a software module presenting an interface allowing a user to capture video content in response to a user comment. In some embodiments, the new lip-sync video is a music video, a dance video, a comedy video, a sports video, a fashion video, a make-up video, or a work-out video. In some embodiments, each lip-sync video is full screen. In further embodiments, the feed is browsed by the user via touchscreen wipe gesture. In some embodiments, the application further comprises a software module presenting an interface allowing a user to create a challenge for other users to generate and upload lip-sync videos for one or more selected audio contents within a given time. In further embodiments, one or more winners are chosen for the best lip-sync videos and prizes are rewarded to the one or more winners. In some embodiments, the application further comprises a software module presenting an interface allowing a user to participate in challenges of generating lip-sync videos for a selected audio content.

In another aspect, disclosed herein are computer-implemented methods of a video processing to generate and share lip-sync videos comprising: presenting, by a computer, an interface allowing a user to select audio content; presenting, by the computer, an interface allowing a user to capture video content; presenting, by the computer, an interface allowing a user to synchronize the audio content with the video content; synthesizing, by the computer, the video content and the audio content to generate a new lip-sync video; automatically sharing, by the computer, the lip-sync video to a social media platform; and providing, by the computer, a lip-sync video feed, the feed comprising a plurality of lip-sync videos, the feed identifying the author of each lip-sync video, the feed comprising tools to allow the user to comment on each lip-sync video and mark each lip-sync video as a favorite. In some embodiments, each lip-sync video is less than 20 seconds in length, less than 15 seconds in length, or less than 10 seconds in length. In some embodiments, the interface allowing a user to select audio content allows the user to select audio content from: a streaming audio track, a pre-existing audio file archived on the digital processing device, and a pre-existing lip-sync video. In some embodiments, the interface allowing a user to capture video content allows the user to capture video content from: a live video stream, a video captured in real-time using the digital processing device, or a pre-existing video file archived on the digital processing device. In some embodiments, the interface allowing a user to select audio content comprises tools allowing the user to edit the audio content. In further embodiments, the editing comprises modification of the speed of the audio content, modification of one or both of the end points of the audio content, and modification of the volume of the audio content. In still further embodiments, the editing comprises mixing the audio content with one or more distinct audio contents. In some embodiments, the interface allowing a user to capture video content comprises tools allowing the user to edit the video content. In further embodiments, the editing comprises modification of the speed of the video content and application of one or more color filters to the video content. In some embodiments, the feed is a featured content feed, a followed-user feed, or a location-based feed. In some embodiments, the user selects audio prior to capturing video. In other embodiments, the user captures video prior to selecting audio. In some embodiments, the interface allowing a user to synchronize the audio content with the video content comprises tools allowing the user to select a start point. In further embodiments, the start point is selected by the user via touchscreen wipe gesture. In some embodiments, the synthesizing the video content and the audio content generates the lip-sync video is performed on the computer using a processor and a memory of the computer. In some embodiments, the method further comprises presenting, by the computer, an interface allowing a user to create a duet video, the interface comprising tools allowing the user to select a pre-existing lip-sync video, wherein the pre-existing lip-sync video is integrated with captured video to create a new duet video. In some embodiments, the method further comprises presenting, by the computer, an interface allowing a user to capture video content in response to a user comment. In some embodiments, the new lip-sync video is a music video, a dance video, a comedy video, a sports video, a fashion video, a make-up video, or a work-out video. In some embodiments, each lip-sync video is full screen. In further embodiments, the feed is browsed by the user via touchscreen wipe gesture. In some embodiments, the method further comprises presenting, by the computer, an interface allowing a user to create a challenge for other users to generate and upload lip-sync videos for one or more selected audio contents within a given time. In further embodiments, one or more winners are chosen for the best lip-sync videos and prizes are rewarded to the one or more winners. In some embodiments, the method further comprises, by the computer, presenting an interface allowing a user to participate in challenges of generating lip-sync videos for a selected audio content.

DETAILED DESCRIPTION OF THE INVENTION

Figure 1:
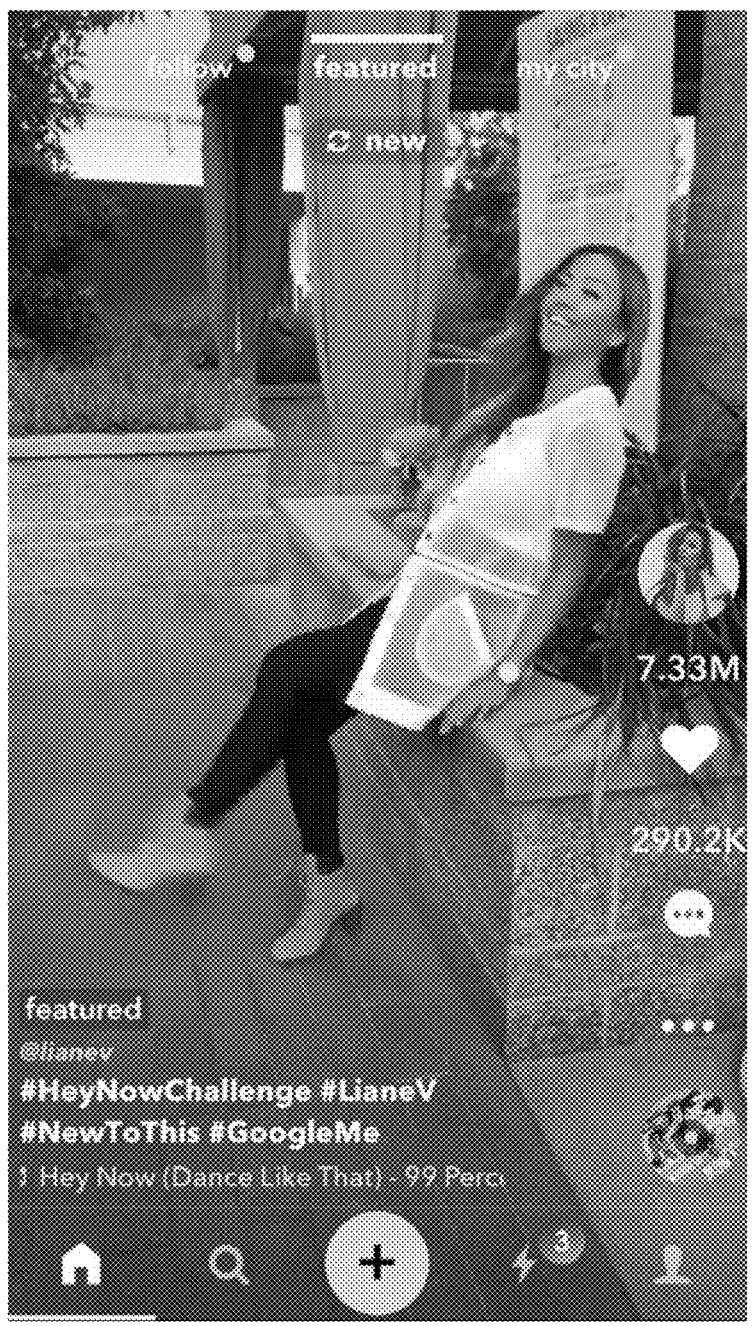
FIG. 1 shows a non-limiting example of an interface for the application described herein; in this case, an interface presenting featured feed videos to a user.

Existing video services fail to provide an ideal combination of free expression in creating lip-sync videos and a sense of community. Described herein are video services that allow users to create short videos (such as 15 seconds) that are long enough to draw a laugh and tell a story, but not too long that teens get bored and move onto the next one. The combination of music, videos, and social networking generates a unique tool for users to experience free expression while immersing in their interested social community. Much more than just another lip-synching-video app, the instant application builds the next social network to revolve around videos.

Described herein, in certain embodiments, are computer-implemented systems comprising: a digital processing device comprising: at least one processor, an operating system configured to perform executable instructions, a memory, and a computer program including instructions executable by the digital processing device to create a video processing application for generating and sharing lip-sync videos comprising: a software module presenting an interface allowing a user to select audio content; a software module presenting an interface allowing a user to capture video content; a software module presenting an interface allowing a user to synchronize the audio content with the video content; a software module synthesizing the video content and the audio content to generate a new lip-sync video; a software module automatically sharing the lip-sync video to a social media platform; and a software module providing a lip-sync video feed, the feed comprising a plurality of lip-sync videos, the feed identifying the author of each lip-sync video, the feed comprising tools to allow the user to comment on each lip-sync video and mark each lip-sync video as a favorite.

Also described herein, in certain embodiments, are non-transitory computer-readable storage media encoded with a computer program including instructions executable by a processor to create a video processing application for generating and sharing lip-sync videos comprising: a software module presenting an interface allowing a user to select audio content; a software module presenting an interface allowing a user to capture video content; a software module presenting an interface allowing a user to synchronize the audio content with the video content; a software module synthesizing the video content and the audio content to generate a new lip-sync video; a software module automatically sharing the lip-sync video to a social media platform; and a software module providing a lip-sync video feed, the feed comprising a plurality of lip-sync videos, the feed identifying the author of each lip-sync video, the feed comprising tools to allow the user to comment on each lip-sync video and mark each lip-sync video as a favorite.

Also described herein, in certain embodiments, are computer-implemented methods of a video processing to generate and share lip-sync videos comprising: presenting, by a computer, an interface allowing a user to select audio content; presenting, by the computer, an interface allowing a user to capture video content; presenting, by the computer, an interface allowing a user to synchronize the audio content with the video content; synthesizing, by the computer, the video content and the audio content to generate a new lip-sync video; automatically sharing, by the computer, the lip-sync video to a social media platform; and providing, by the computer, a lip-sync video feed, the feed comprising a plurality of lip-sync videos, the feed identifying the author of each lip-sync video, the feed comprising tools to allow the user to comment on each lip-sync video and mark each lip-sync video as a favorite.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

User Profile

In some embodiments, the systems, media, and methods described herein include user profiles, or use of the same. In some embodiments, a software module is configured to allow a user to create, update, and manage a user profile. In some embodiments, a software module is configured to allow a user to log in with Facebook, Twitter, email or other social media accounts. In some embodiments, a software module is configured to view and edit his profile information. In some embodiments, a user's followings, fans of his, and likes for his videos are displayed in this profile page. In some embodiments, a user profile comprises information regarding username, his name, Instagram ID, birth year, and short bio, among other things.

Figure 4:
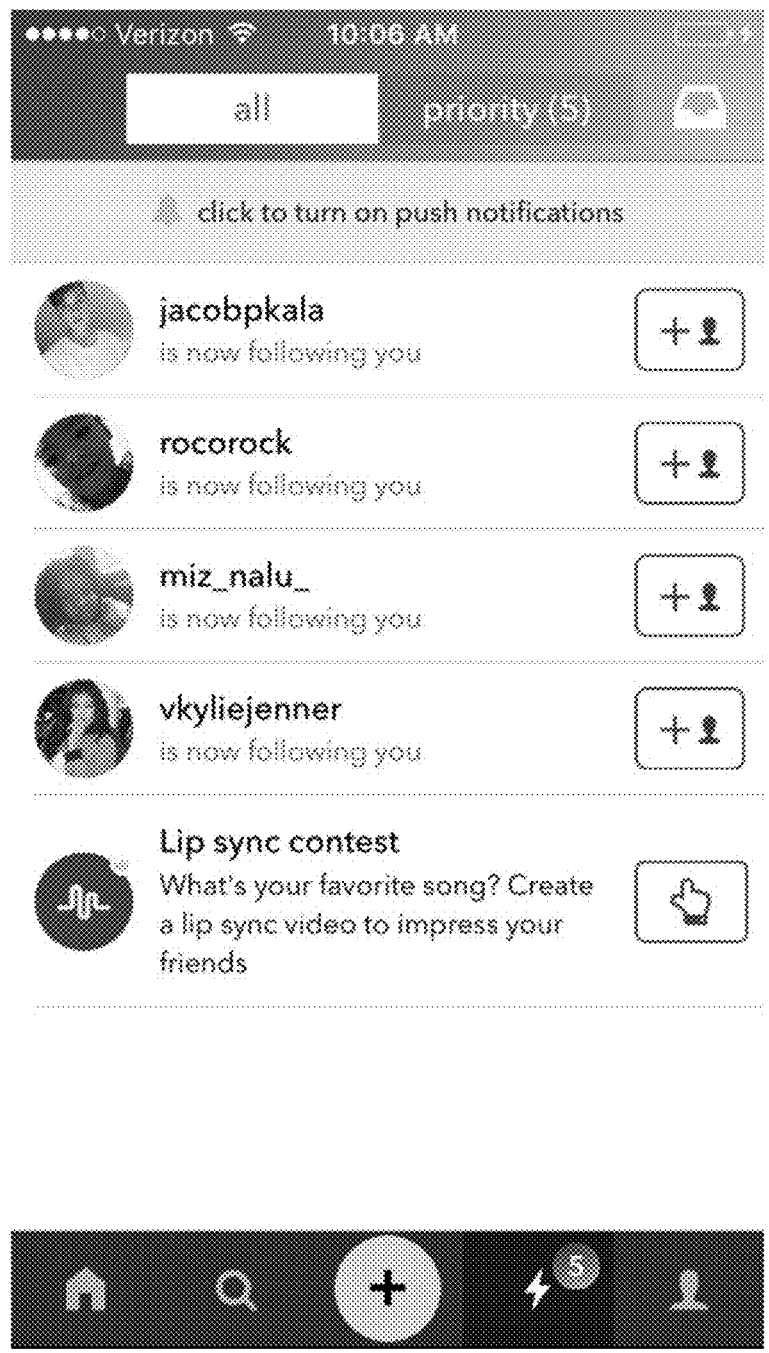
FIG. 4 shows a non-limiting example of an interface for the application described herein; in this case, an interface allowing a user to view, edit, delete, and interact with his social networking followers.
Figure 5:
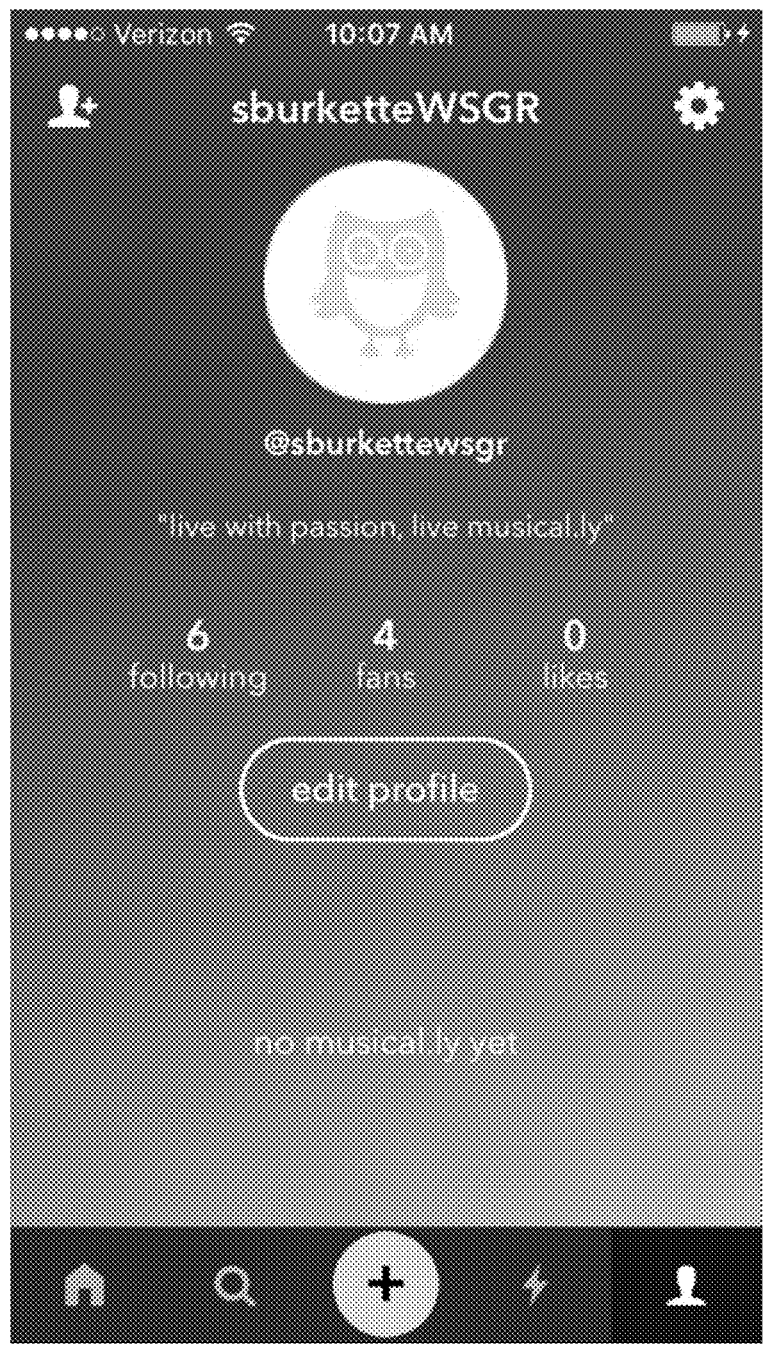
FIG. 5 shows a non-limiting example of an interface for the application described herein; in this case, an interface allowing a user to view his own information including profile information and social networking connection information.
Figure 6:
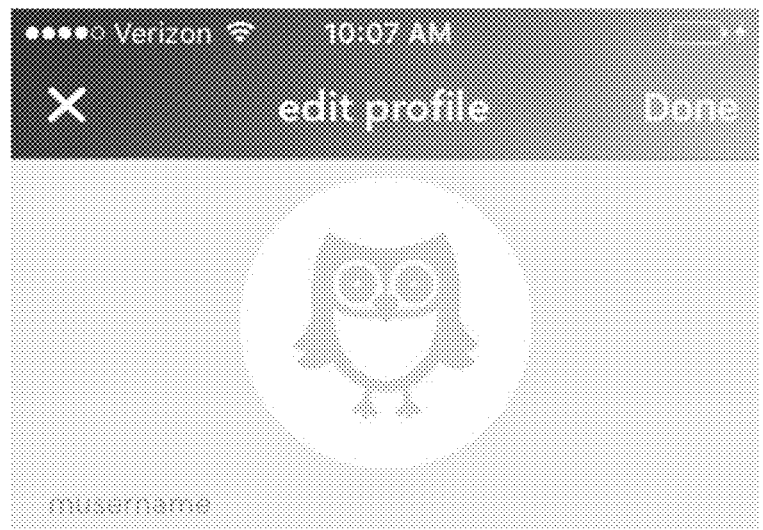
FIG. 6 shows a non-limiting example of an interface for the application described herein; in this case, an interface allowing a user to view and edit his profiles.
Figure 7:
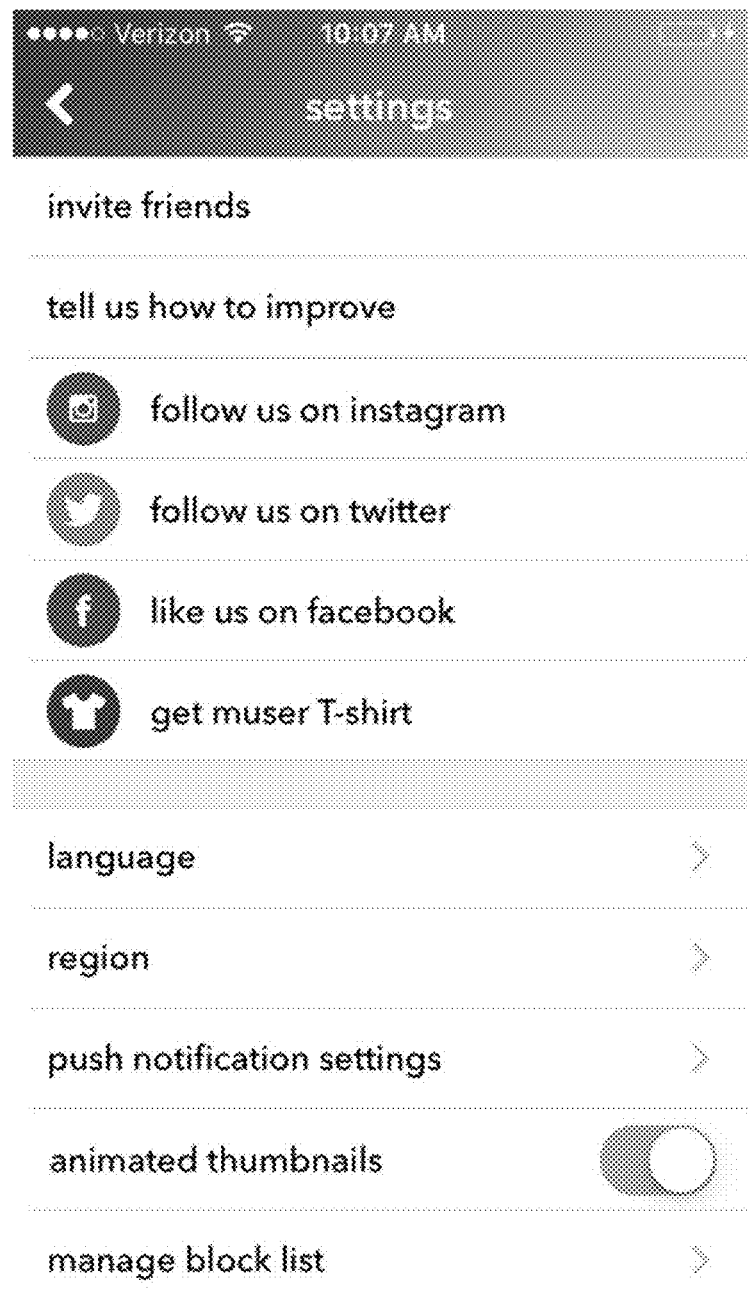
FIG. 7 shows a non-limiting example of an interface for the application described herein; in this case, an interface allowing a user to view and edit his settings.

Referring to FIG. 4, in a particular embodiment, an interface is provided to allow a user to view, edit, delete, and interact with his social networking followers. In some embodiments, a user is allowed to change his notification settings. Referring to FIG. 5, in a particular embodiment, an interface is provided to allow a user to view his own information including profile information and social networking connection information. Referring to FIG. 6, in a particular embodiment, an interface is provided to allow a user to view and edit his profiles. Referring to FIG. 7, in a particular embodiment, an interface is provided to allow a user to view and edit his settings.

Figure 8:
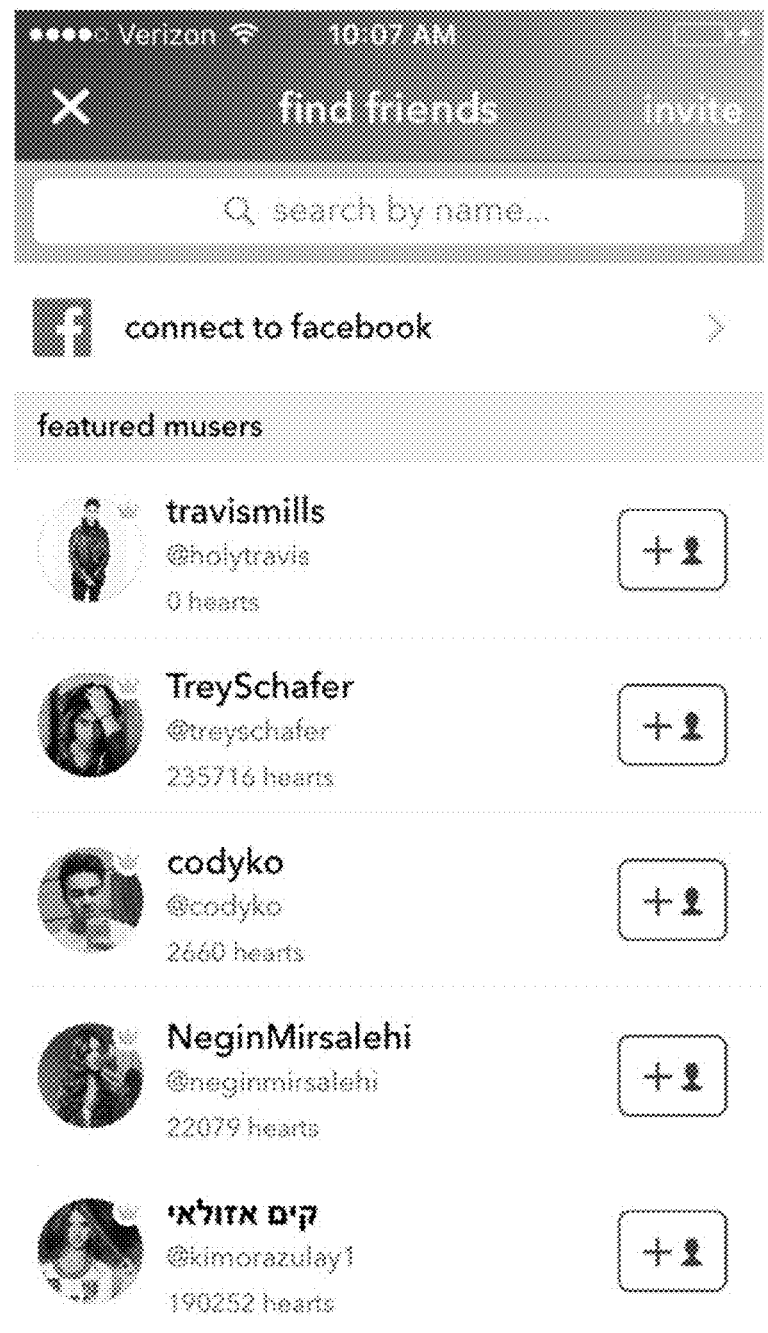
FIG. 8 shows a non-limiting example of an interface for the application described herein; in this case, an interface allowing a user to view, search, invite, edit, and delete friends.
Figure 9:
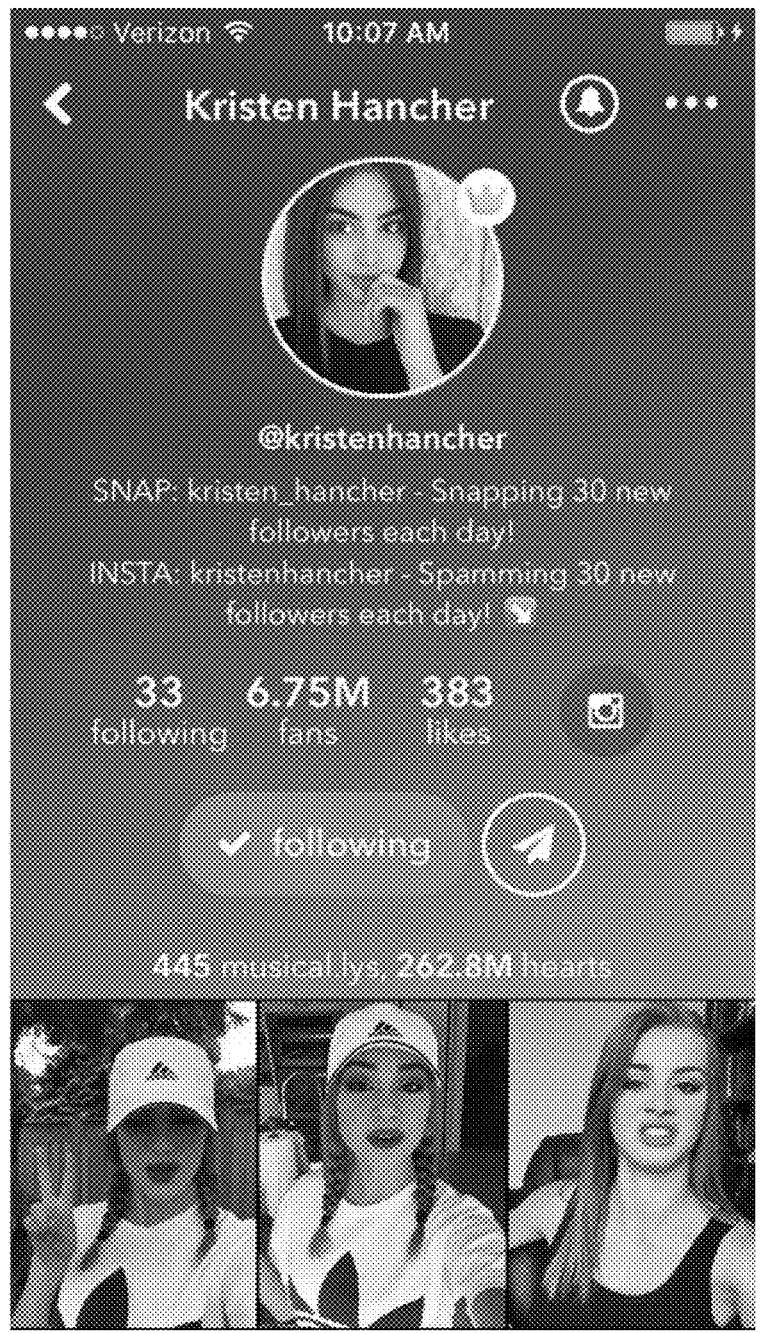
FIG. 9 shows a non-limiting example of an interface for the application described herein; in this case, an interface allowing a user to view another user's information including profile information, social networking connection information and video contents.

In some embodiments, a user is allowed to manage his friends within the social media networking. Referring to FIG. 8, in a particular embodiment, an interface is provided to allow a user to view, search, invite, edit, and delete friends. In some embodiments, a user is allowed to review other users' profile pages. Referring to FIG. 9, in a particular embodiment, an interface is provided to allow a user to view another user's information including profile information, social networking connection information and video contents. From a second user's page, a first user is allowed to follow the second user and interact with the second user.

Social Networking

Figure 22:
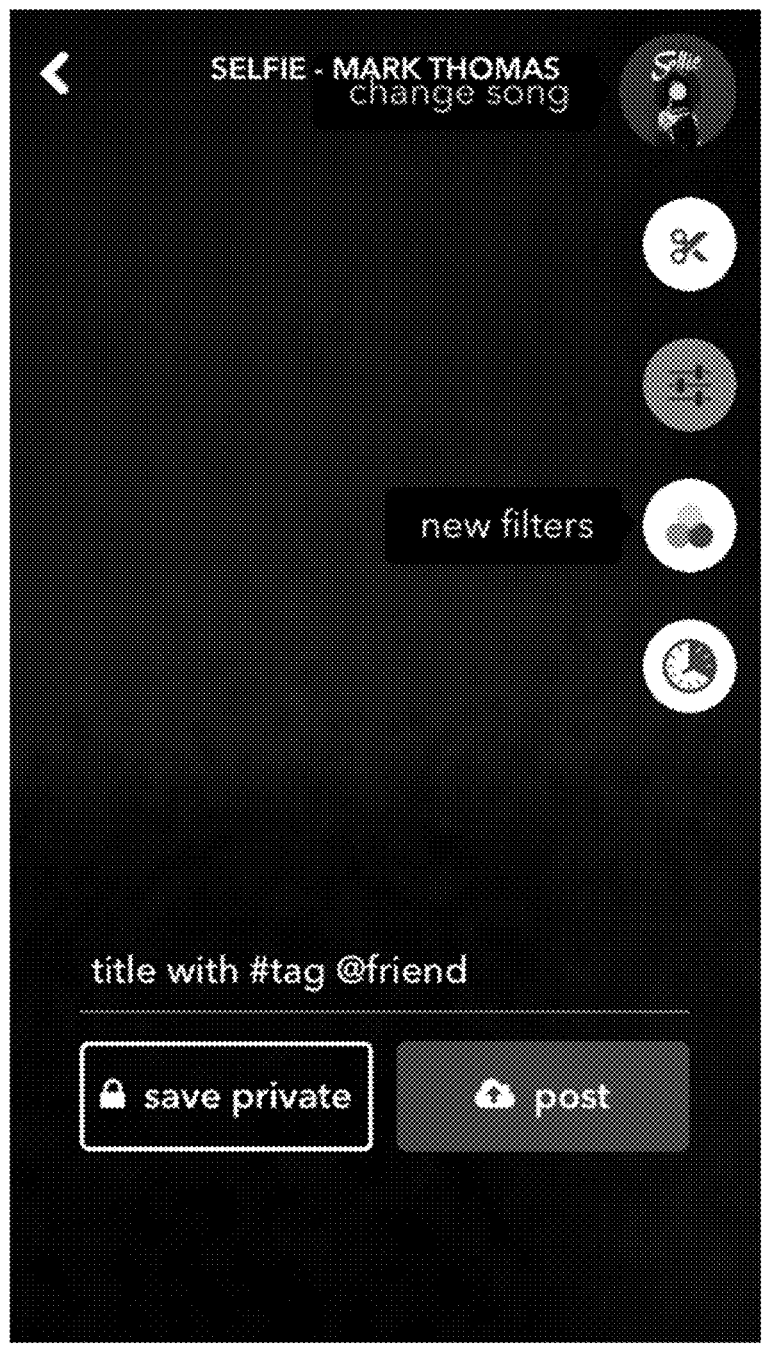
FIG. 22 shows a non-limiting example of an interface for the application described herein; in this case, an interface allowing a user to choose to keep a recorded video private or post it on a social media platform.

In some embodiments, the platforms, systems, media, and methods described herein include features for conducting social networking, or use of the same. In some embodiments, a user shares videos through social networking platform. In some embodiments, a software module is configured to allow a user to automatically share the lip-sync video to a social media platform. In some embodiments, a user is provide a tool to provide a lip-sync video feed within a social network, the feed comprising a plurality of lip-sync videos, the feed identifying the author of each lip-sync video, the feed comprising tools to allow the user to comment on each lip-sync video and mark each lip-sync video as a favorite. In some embodiments, a user is allowed to keep a generated video private. In some embodiments, a user is allowed to share a generated video within a social networking media. Referring to FIG. 22, in a particular embodiment, an interface is provided to allow a user to choose to keep a recorded video private or post it on a social media platform.

Figure 2:
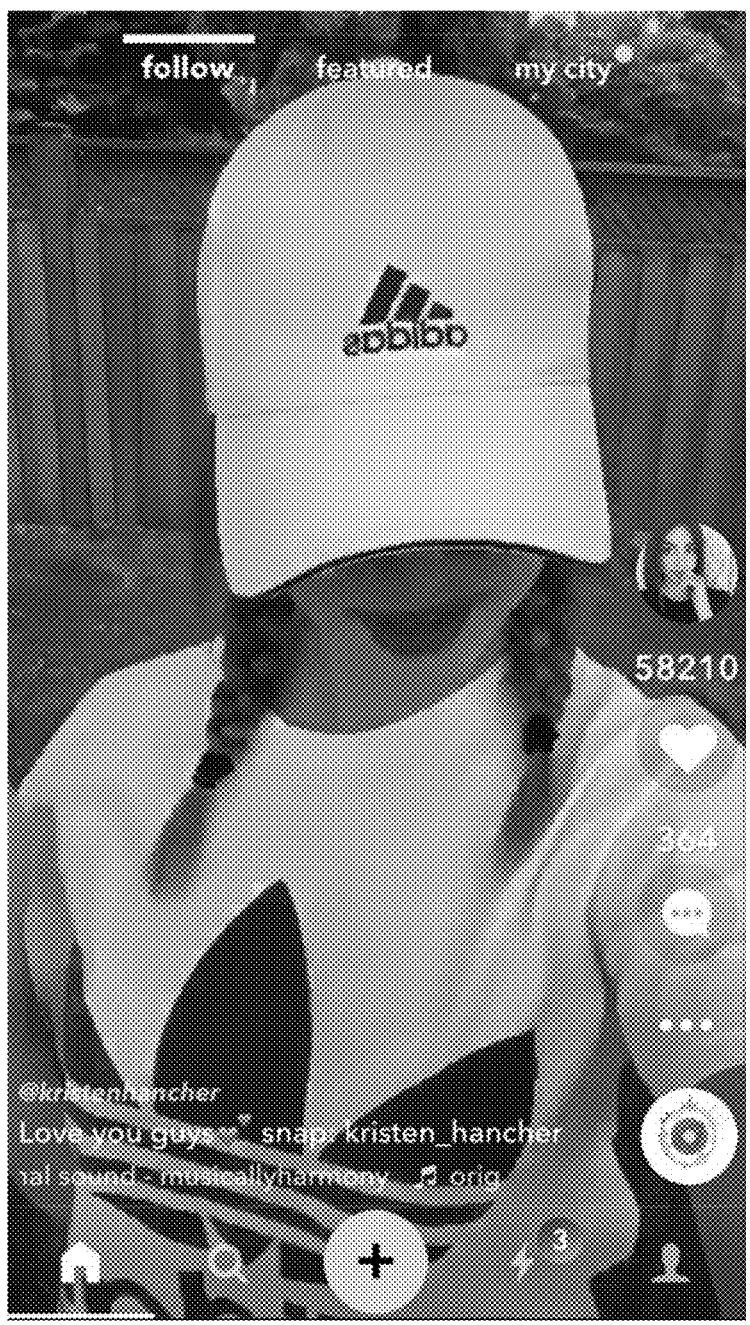
FIG. 2 shows a non-limiting example of an interface for the application described herein; in this case, an interface presenting follow feed videos to a user.
Figure 3:
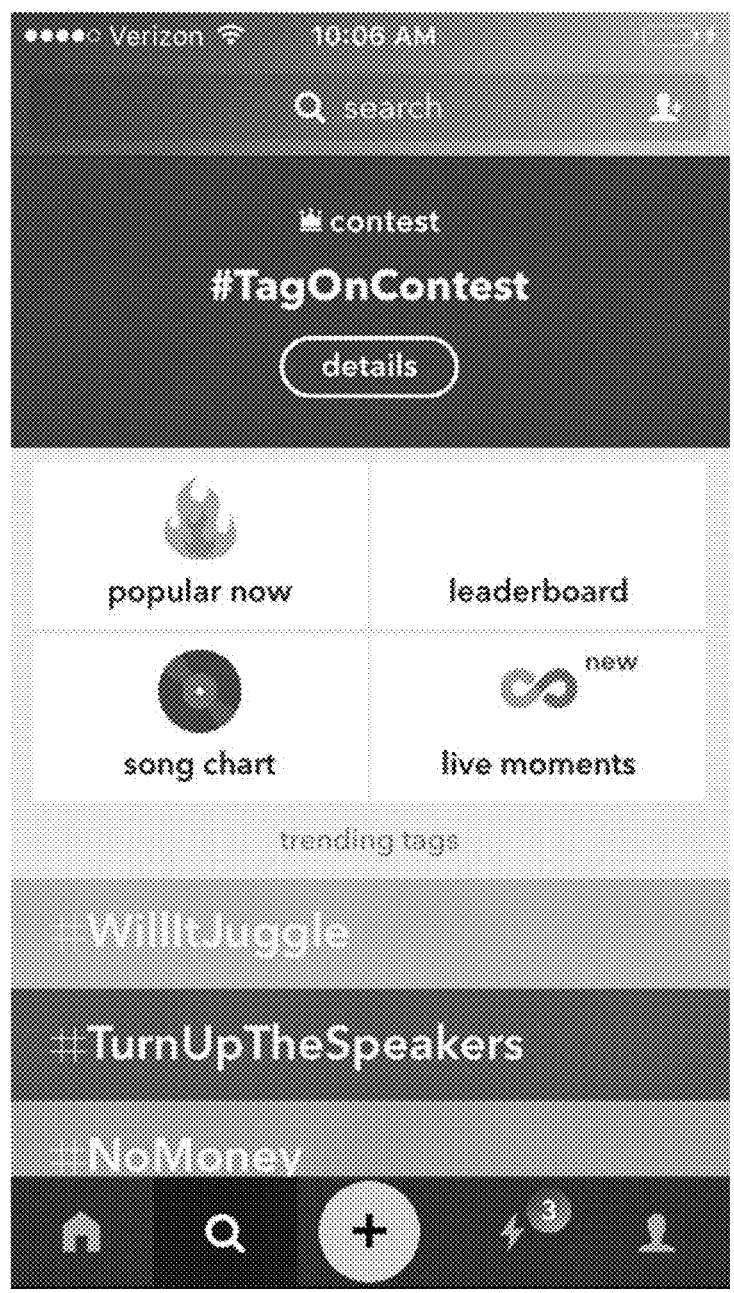
FIG. 3 shows a non-limiting example of an interface for the application described herein; in this case, an interface allowing a user to browse and search videos.

In some embodiments, a video feed is a featured content feed, a followed-user feed, or a location-based feed. Referring to FIG. 1, in a particular embodiment, an interface is provided to present featured feed videos to a user. Referring to FIG. 2, in a particular embodiment, an interface is provided to present follow feed videos to a user. In some embodiments, a video feed is browsed by the user via touchscreen wipe gesture. Referring to FIG. 3, in a particular embodiment, an interface is provided to allow a user to browse and search videos.

In some embodiments, a user is allowed to follow another user and his videos. In some embodiments, a user and his videos are followed by another user. Referring to FIG. 4, in a particular embodiment, an interface is provided to allow a user to view, edit, delete, and interact with his social networking followers. In some embodiments, a user is allowed to change his notification settings.

In some embodiments, a user is allowed to make friends within the social media networking. Referring to FIG. 8, in a particular embodiment, an interface is provided to allow a user to view, search, invite, edit, and delete friends. In some embodiments, a user is allowed to review other users' profile pages.

Figure 11:
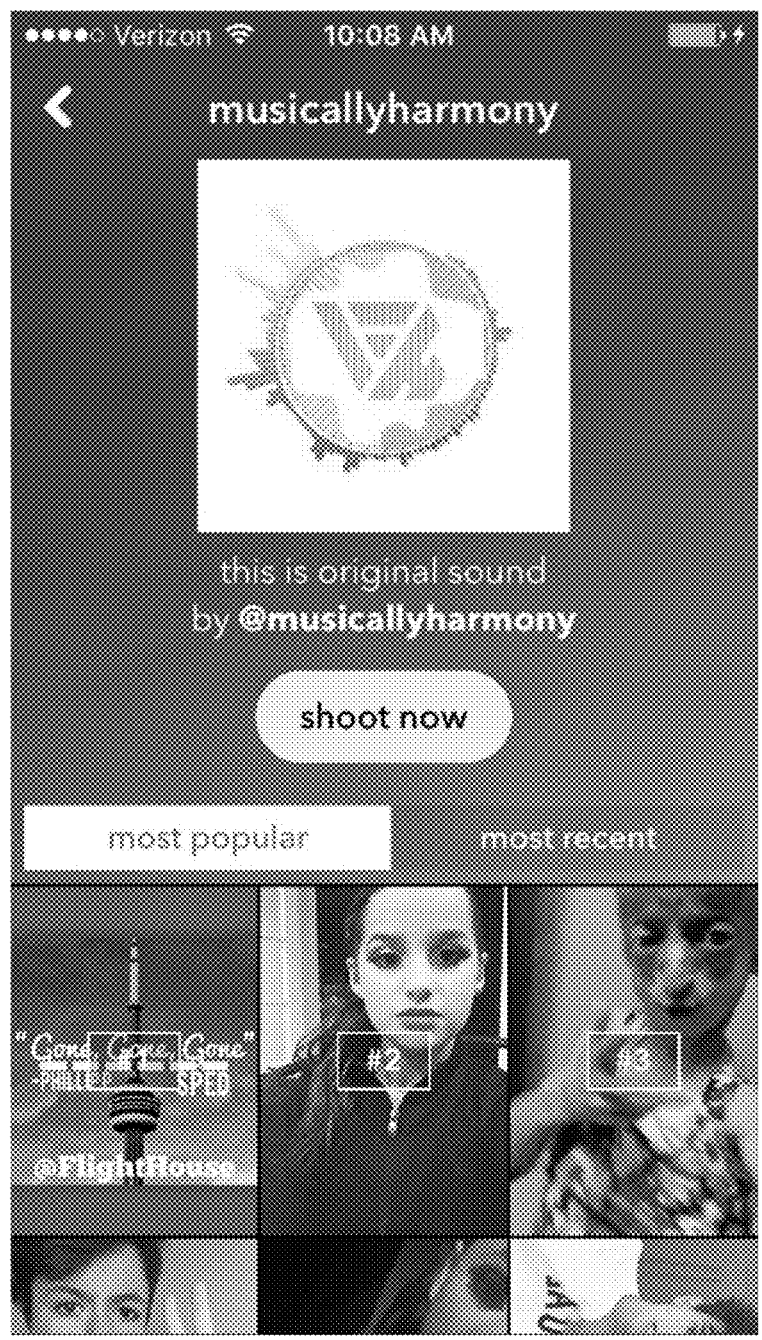
FIG. 11 shows a non-limiting example of an interface for the application described herein; in this case, an interface allowing a user to view videos associated with a selected audio content and to generate a lip-sync video for the selected audio content.

In some embodiments, a user is allowed to browse, search and choose socially shared videos within a social networking media. In some embodiments, most popular and most recent videos are presented to a user. Referring to FIG. 11, in a particular embodiment, an interface is provided to allow a user to view videos associated with a selected audio content and to generate a lip-sync video for the selected audio content.

Figure 10:
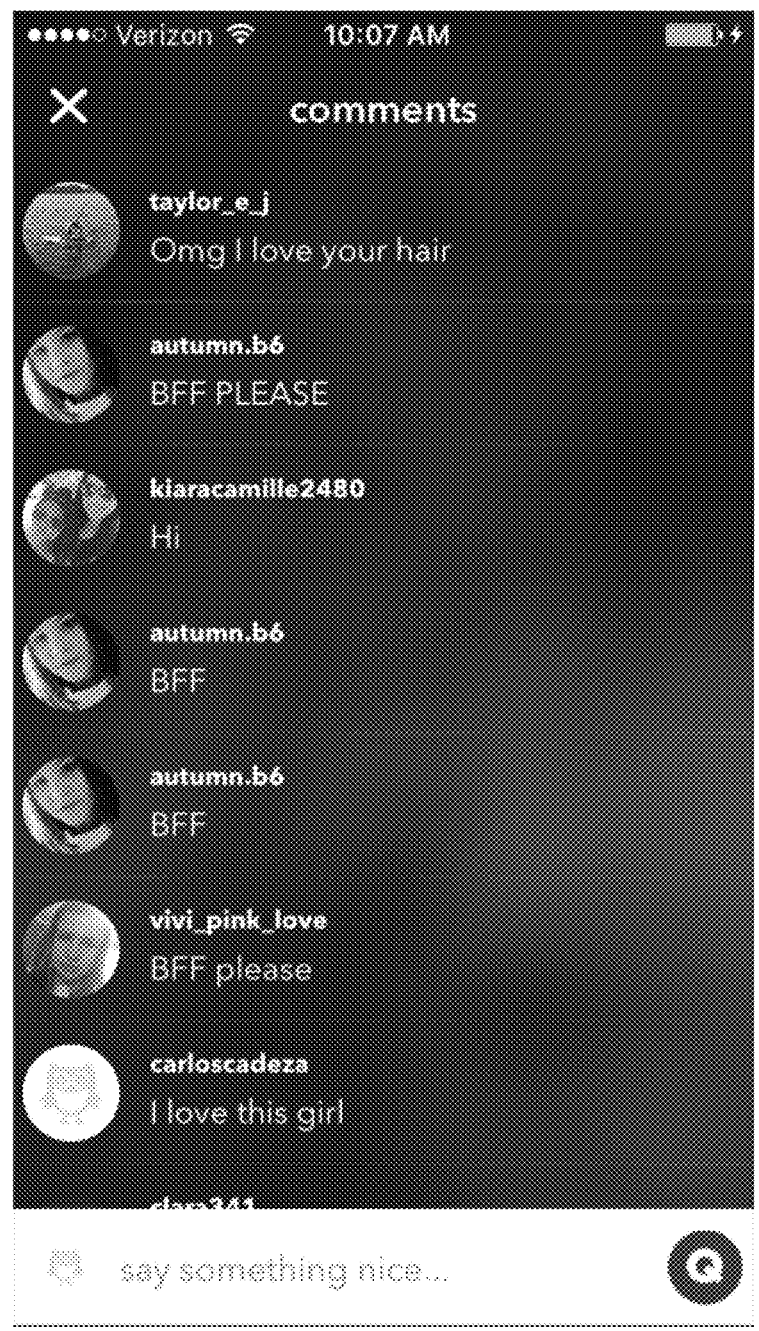
FIG. 10 shows a non-limiting example of an interface for the application described herein; in this case, an interface allowing a user to view and edit comments for a video.

In some embodiments, a user is allowed to view and post comments on a socially shared video. Referring to FIG. 10, in a particular embodiment, an interface is provided to allow a user to view and edit comments for a video.

In some embodiments, social networking is conducted within the presently described platforms and systems. In further embodiments, users within the inner networking are allowed to follow, make friends, and interact with each other. In some embodiments, social networking is conducted through third-party social networking media account. In further embodiments, the social networking media account is imported from one or more of: Facebook, YouTube, Twitter, LinkedIn, Pinterest, Google Plus+, Tumblr, Instagram, Reddit, VK, Snapchat, Flickr, Vine, Meetup, Ask.fm, Classmates, QQ, WeChat, Swarm by Foursquare, Kik, Yik Yak, Shots, Periscope, Medium, Soundcloud, Tinder, WhatsApp, Slack, Musical.ly, Peach, Blab, Email, Message, Renren, Sina Weibo, Renren, Line, and Momo.

Interface for Selecting Audio Content

In some embodiments, the platforms, systems, media, and methods described herein include an interface for selecting audio content, or use of the same. In some embodiments, an interface is provided to allow a user to select audio content allows the user to select audio content from: a streaming audio track, a pre-existing audio file archived on the digital processing device, and a pre-existing lip-sync video.

In some embodiments, an interface is provided to allow a user to select audio content comprises tools allowing the user to edit the audio content. In further embodiments, the editing comprises modification of the speed of the audio content, modification of one or both of the end points of the audio content, and modification of the volume of the audio content. In further embodiments, the editing comprises mixing the audio content with one or more distinct audio contents.

Figure 15:
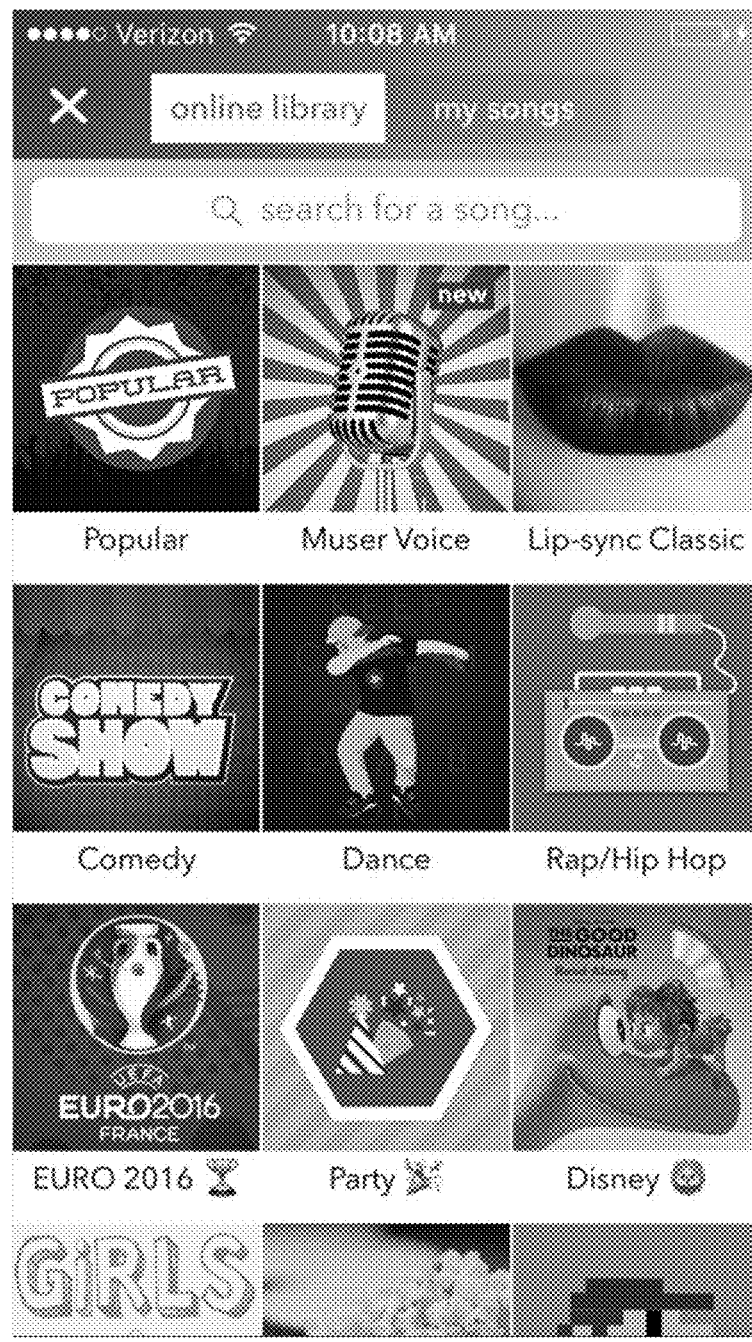
FIG. 15 shows a non-limiting example of an interface for the application described herein; in this case, an interface allowing a user to browse and search different kinds of audio content from online library.
Figure 16:
FIG. 16 shows a non-limiting example of an interface for the application described herein; in this case, an interface allowing a user to view and search audio content within his own audio contents.
Figure 16:
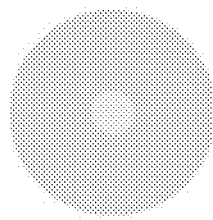

In some embodiments, audio contents are selected from online library. In some embodiments, audio contents are selected from a user's own audio contents. Referring to FIG. 15, in a particular embodiment, an interface is provided to allow a user to browse and search different kinds of audio content from online library. Referring to FIG. 16, in a particular embodiment, an interface is provided to allow a user to view and search audio content within his own audio contents.

In some embodiments, a user is allowed to use audio mixer to select the volume level between the original video sound and the selected sound clip. In further embodiments, the user taps on the knob of the slider and move the finger horizontally to balance the volume between the original video sound and the selected sound clip. In further embodiments, the user moves left to increase the volume of the original video sound and moves right to increase the volume of the selected sound clip.

In some embodiments, a user selects audio prior to capturing video. In some embodiments, a user captures video prior to selecting audio.

Interface for Capturing Video Content

Figure 12:
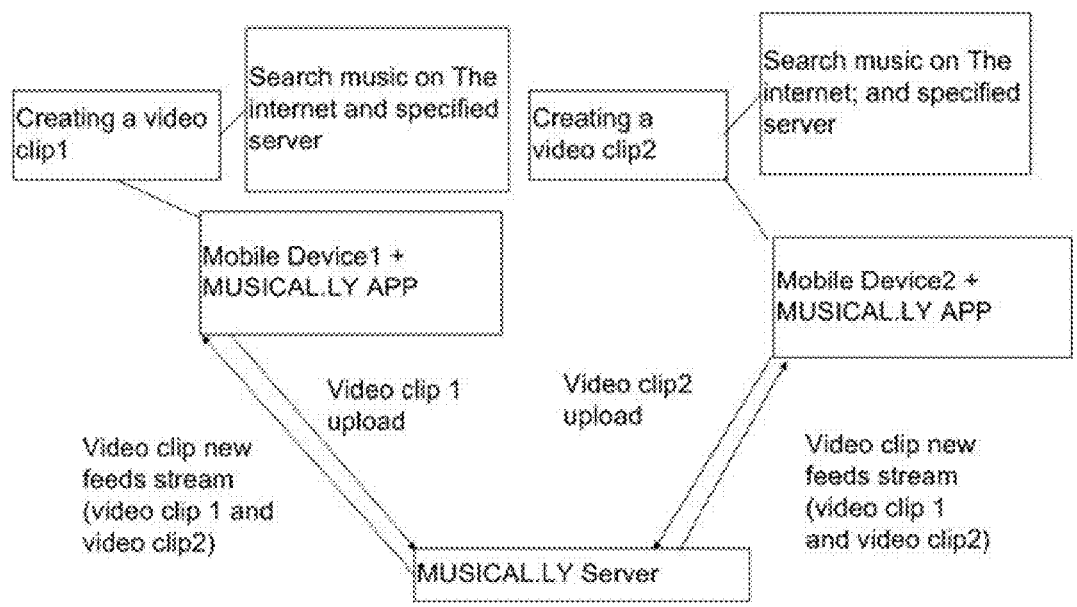
FIG. 12 shows a non-limiting example of a process flow for creating a music video using the application described herein; in this case, a process flow about how users make lip-sync videos through the combination of audio content and video content and provide video feed to the server.
Figure 13:
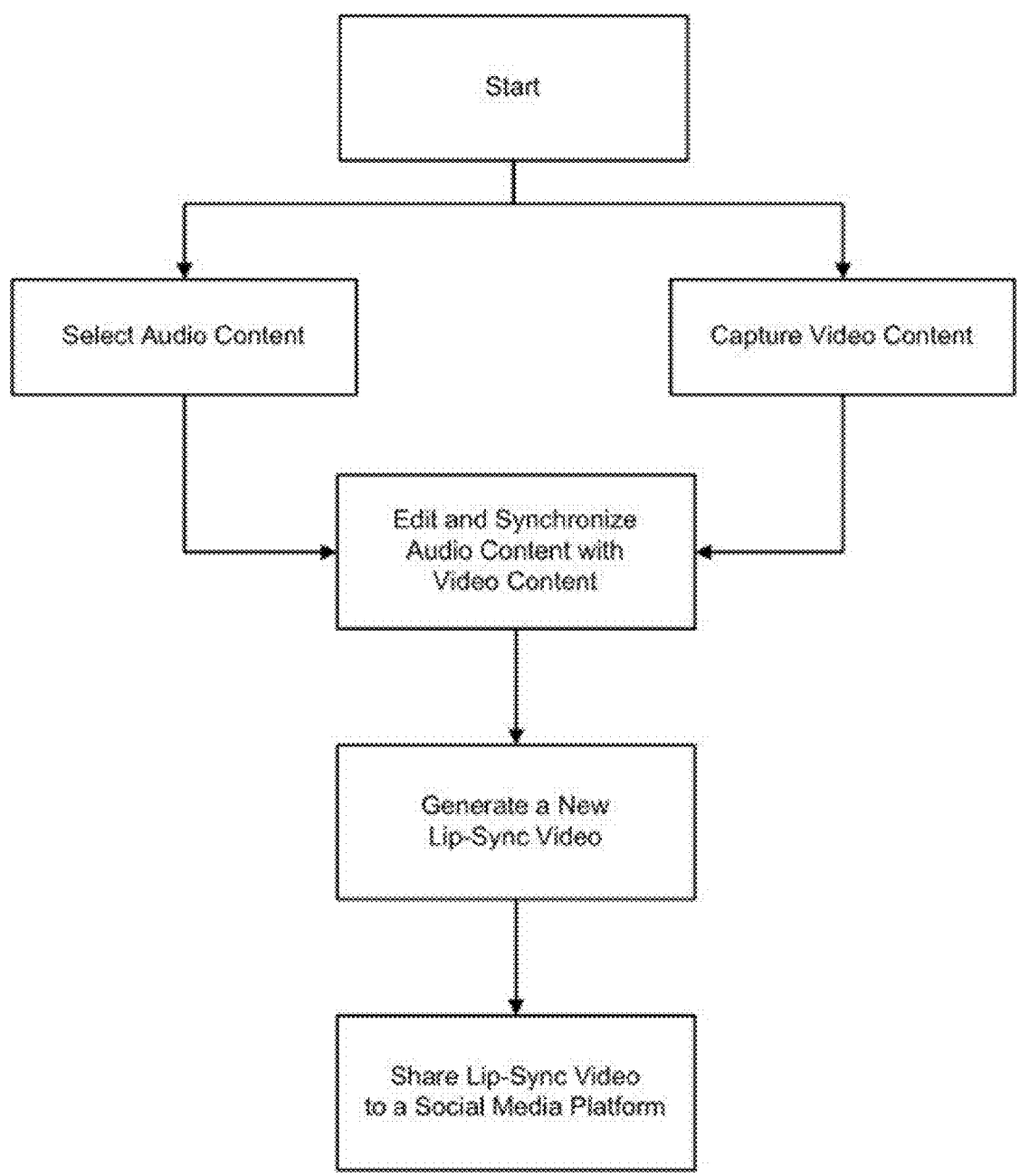
FIG. 13 shows a non-limiting example of a process flow for creating a music video using the application described herein; in this case, a process flow including steps of selecting audio content, capturing video content, editing and synchronizing audio content with video content, generating a new lip-sync video, and sharing the lip-sync video to a social media platform.

In some embodiments, the platforms, systems, media, and methods described herein include an interface for capturing video content, or use of the same. Referring to FIG. 12, in a particular embodiment, a process flow is described to show how users make lip-sync videos through the combination of audio content and video content and provide video feed to the server. Referring to FIG. 13, in a particular embodiment, a process flow is described to include steps of selecting audio content, capturing video content, editing and synchronizing audio content with video content, generating a new lip-sync video, and sharing the lip-sync video to a social media platform.

In some embodiments, an interface is provided to allow a user to capture video content from: a live video stream, a video captured in real-time using the digital processing device, or a pre-existing video file archived on the digital processing device.

Figure 14:
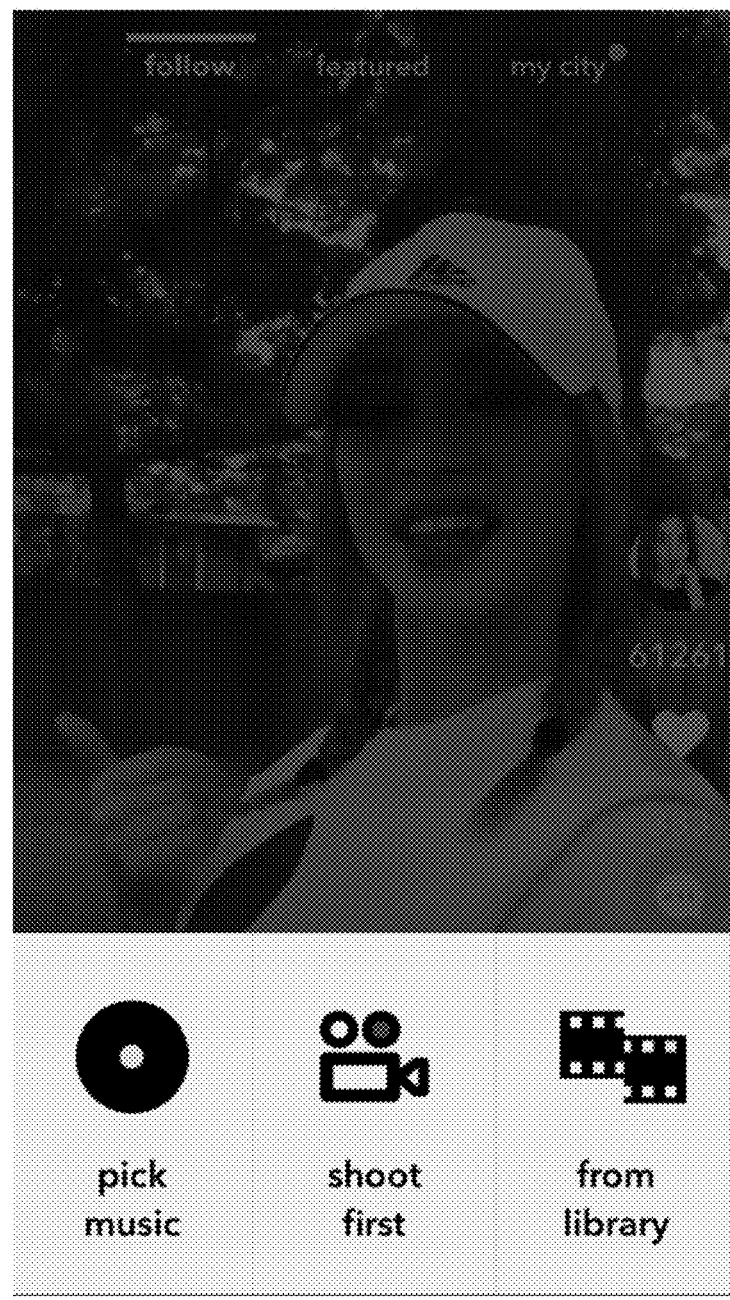
FIG. 14 shows a non-limiting example of an interface for the application described herein; in this case, an interface presenting different options for a user to create videos including picking music first, shoot videos first, and selecting from video library.

In some embodiments, a user selects audio prior to capturing video. In some embodiments, a user captures video prior to selecting audio. In some embodiments, three shooting modes are allowed to create music video. Referring to FIG. 14, in a particular embodiment, an interface is provided to present different options for a user to create videos including picking music first, shoot videos first, and selecting from video library.

In some embodiments, a user picks music first before capturing video content. In further embodiments, a user taps to enter the select sound page, once the user selected the sound it will lead to the shooting page. In some embodiments, a user is allowed to switch and shoot with different speed mode for the same music video.

Figure 17:
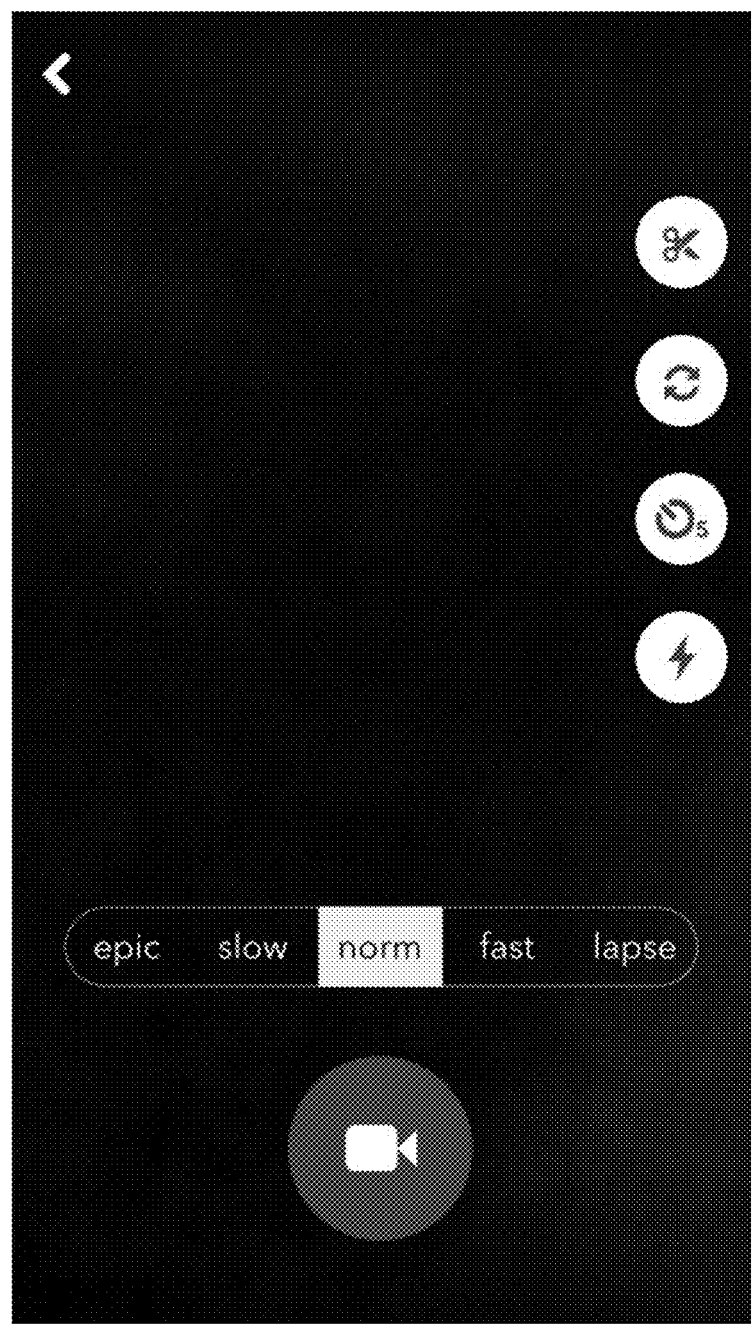
FIG. 17 shows a non-limiting example of an interface for the application described herein; in this case, an interface allowing a user to record videos after selecting an audio content wherein the user has the option to change the audio content to epic, slow, normal, fast, and lapse.

Referring to FIG. 17, in a particular embodiment, an interface is provided to allow a user to record videos after selecting an audio content wherein the user has the option to change the audio content to epic, slow, normal, fast, and lapse. In further embodiments, when a user picks music first, he is allowed to pick from online library or from a user's own audio contents. Referring to FIG. 15, in a particular embodiment, an interface is provided to allow a user to browse and search different kinds of audio content from online library. Referring to FIG. 16, in a particular embodiment, an interface is provided to allow a user to view and search audio content within his own audio contents.

In some embodiments, a user shoots videos first before generating lip-sync videos. In further embodiments, a user taps to enter the shooting page, a random sound from local library will be selected as default sound and the user has the option to pick a new sound to overwrite it.

Figure 18:
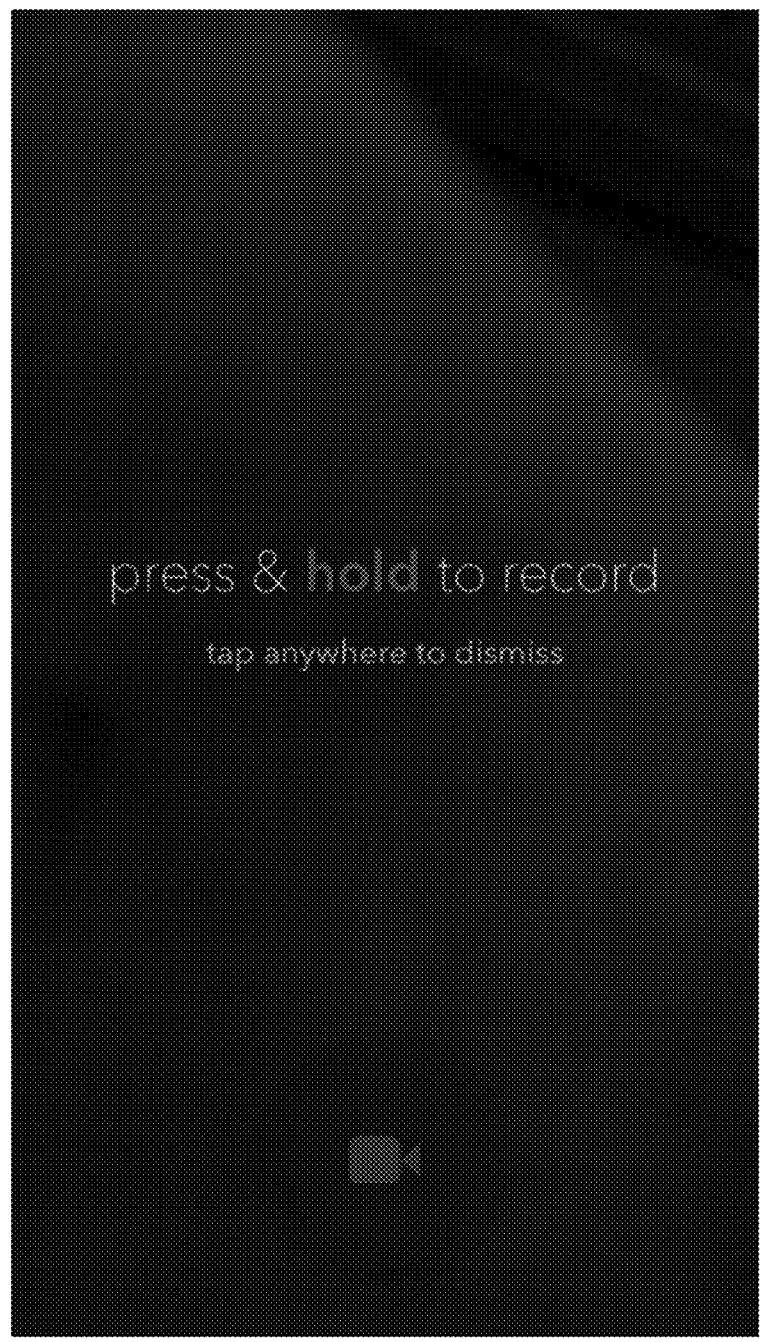
FIG. 18 shows a non-limiting example of an interface for the application described herein; in this case, an interface allowing a user to press and hold a button to record videos.
Figure 19:
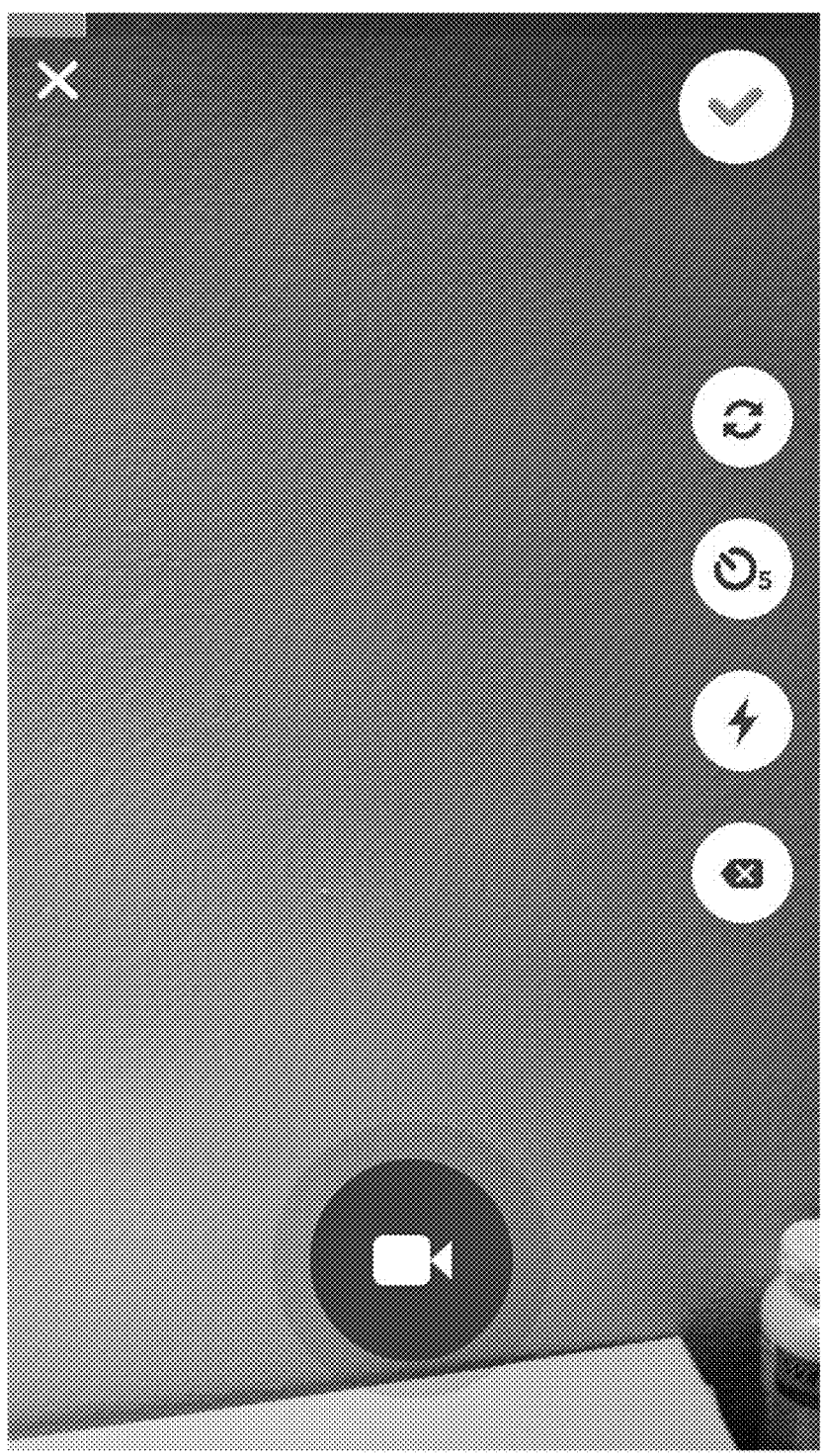
FIG. 19 shows a non-limiting example of an interface for the application described herein; in this case, an interface allowing a user to record videos wherein the user has the option of switching cameras, starting a 5-second countdown, turning on/off flashlight, and deleting part or all of the recording segments and saving the recording.

Referring to FIG. 18, in a particular embodiment, an interface is provided to allow a user to press and hold a button to record videos. In some embodiments, a user has lots of flexibilities while capturing video content. Referring to FIG. 19, in a particular embodiment, an interface is provided to allow a user to record videos wherein the user has the option of switching cameras, starting a 5-second countdown, turning on/off flashlight, and deleting part or all of the recording segments and saving the recording.

Figure 20:
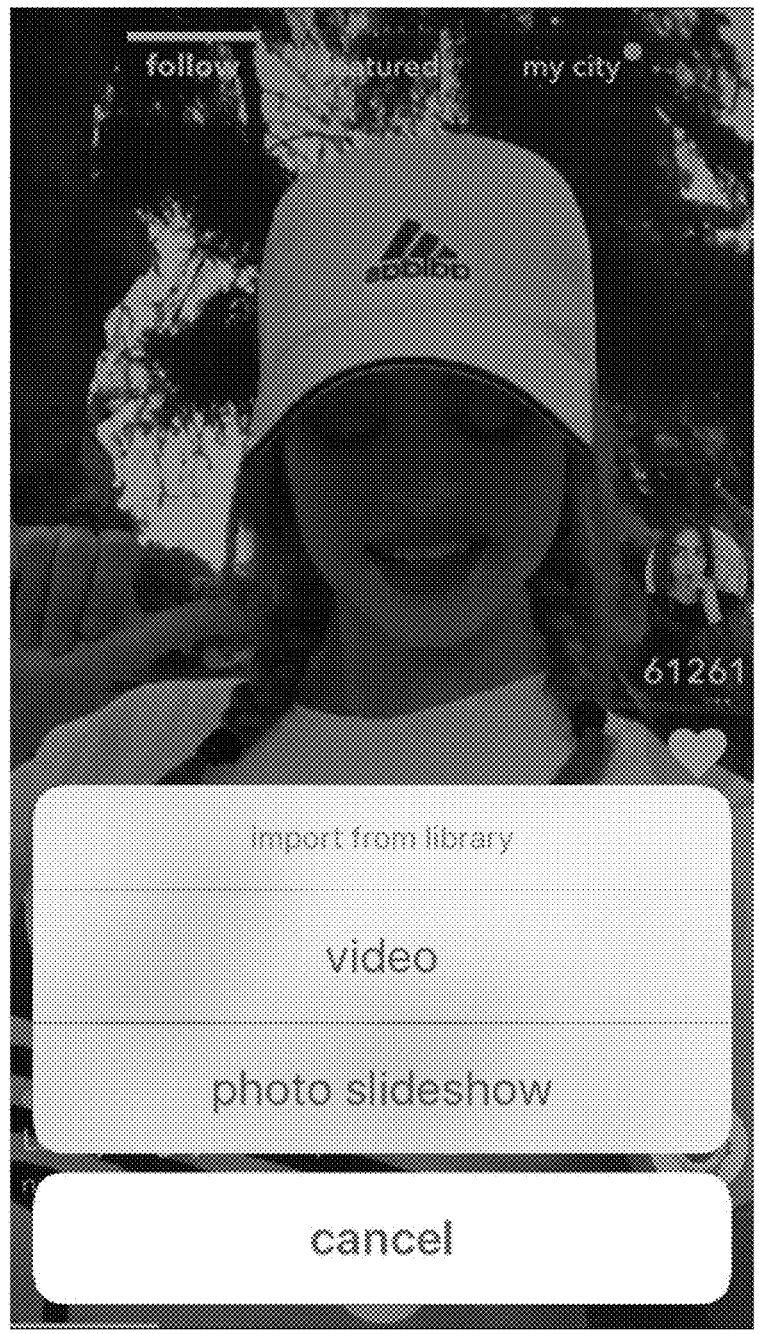
FIG. 20 shows a non-limiting example of an interface for the application described herein; in this case, an interface allowing a user to choose videos or photo slideshows from a library.

In some embodiments, a user captures video content through the importing from video library. In further embodiments, a user taps to enter the camera roll to pick an existing video, then the user can add the sound from the preview screen. Referring to FIG. 20, in a particular embodiment, an interface is provided to allow a user to choose videos or photo slideshows from a library.

Figure 23:
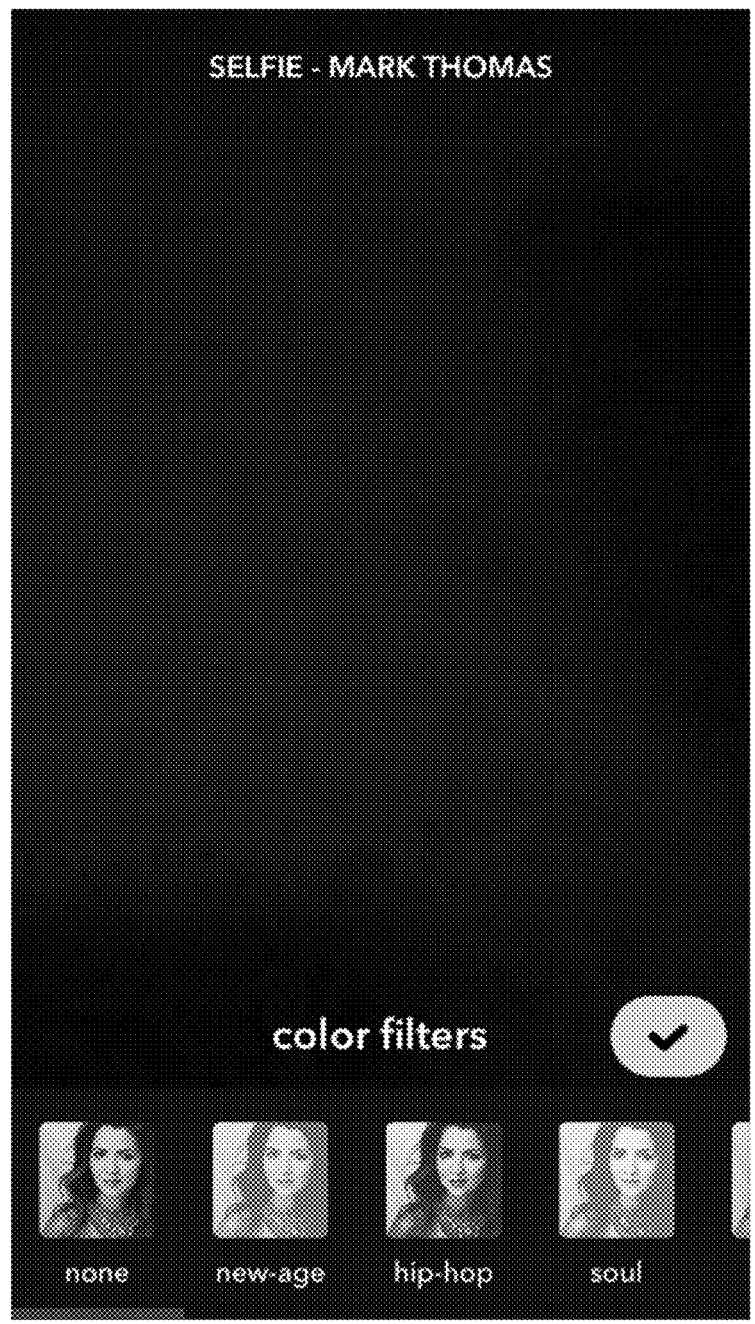
FIG. 23 shows a non-limiting example of an interface for the application described herein; in this case, an interface allowing a user to choose video filters including new-age, hip-hop, soul, folk, country, blues, pop, cello, Latin, rock, violin, and piano.

In some embodiments, an interface allowing a user to capture video content comprises tools allowing the user to edit the video content. In further embodiments, the editing comprises modification of the speed of the video content and application of one or more color filters to the video content. In some embodiments, a user is allowed to swipe to switch color filter. Referring to FIG. 23, in a particular embodiment, an interface is provided to allow a user to choose video filters name with music styles including new-age, hip-hop, soul, folk, country, blues, pop, cello, Latin, rock, violin, and piano.

Figure 24:
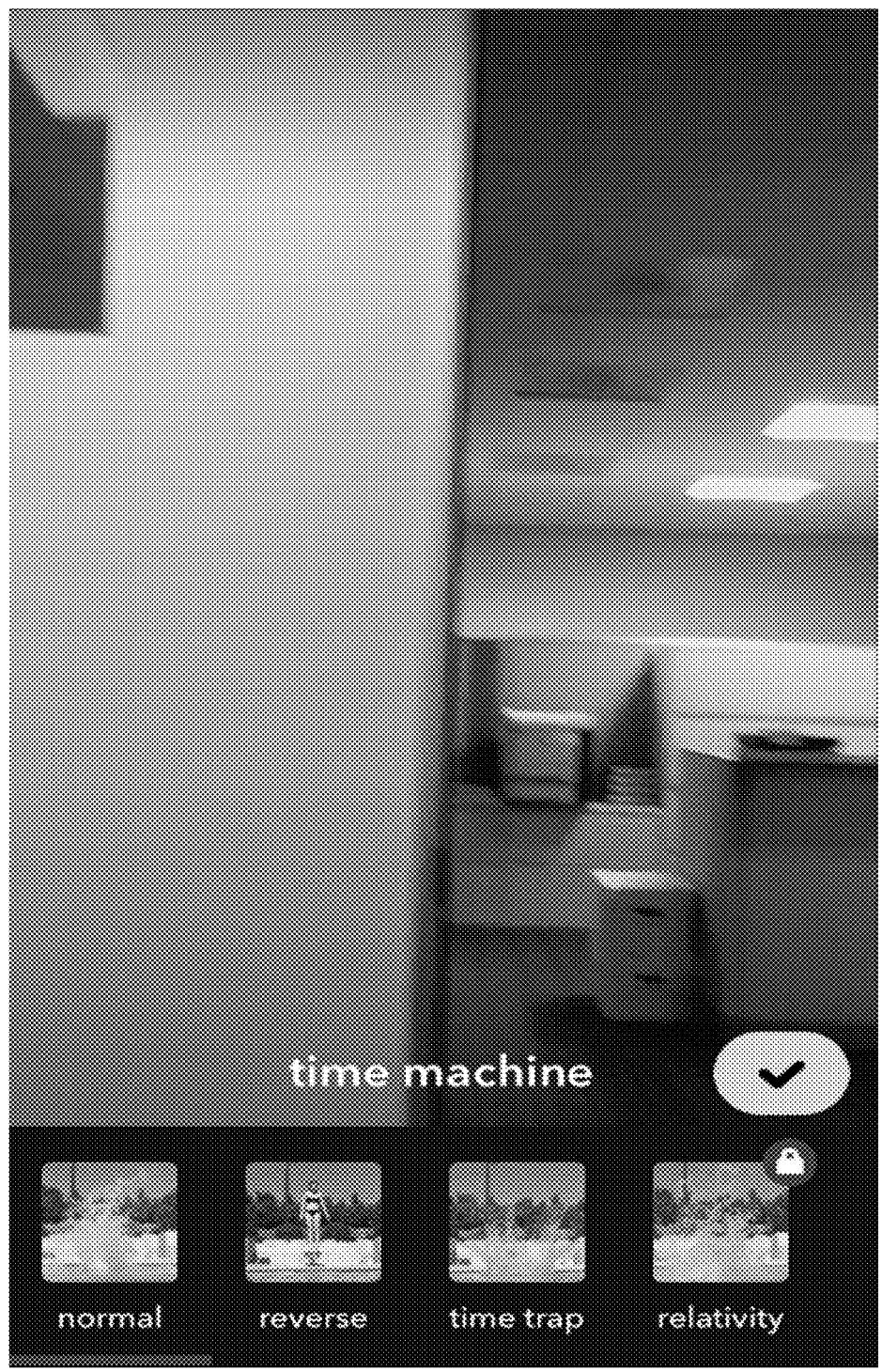
FIG. 24 shows a non-limiting example of an interface for the application described herein; in this case, an interface allowing a user to enable time machine to create more dramatic effects to the music video, the effects including reverse, time trap, and relativity.

In some embodiments, a time machine is used to create more dramatic effects to the captured video content. Referring to FIG. 24, in a particular embodiment, an interface is provided to allow a user to enable time machine to create more dramatic effects to the music video, the effects including reverse, time trap, and relativity.

Interface for Synchronizing Audio and Video Content

In some embodiments, the platforms, systems, media, and methods described herein include an interface for synchronizing audio and video content, or use of the same. In some embodiments, an interface is provided to allow a user to select audio content comprises tools allowing the user to edit the audio content. In further embodiments, the editing comprises modification of the speed of the audio content, modification of one or both of the end points of the audio content, and modification of the volume of the audio content. In further embodiments, the editing comprises mixing the audio content with one or more distinct audio contents.

In some embodiments, selected music will be played while shooting button is being pressed. In some embodiments, once user press the shooting button, the video recording will get started (indicated by the progress bar) and the selected sound clip will start to play. In some embodiments, if a user stopped the video recording by releasing the shooting button, the sound will also be paused. In some embodiments, if a user resumes the recording and the sound will also be resumed.

Figure 21:
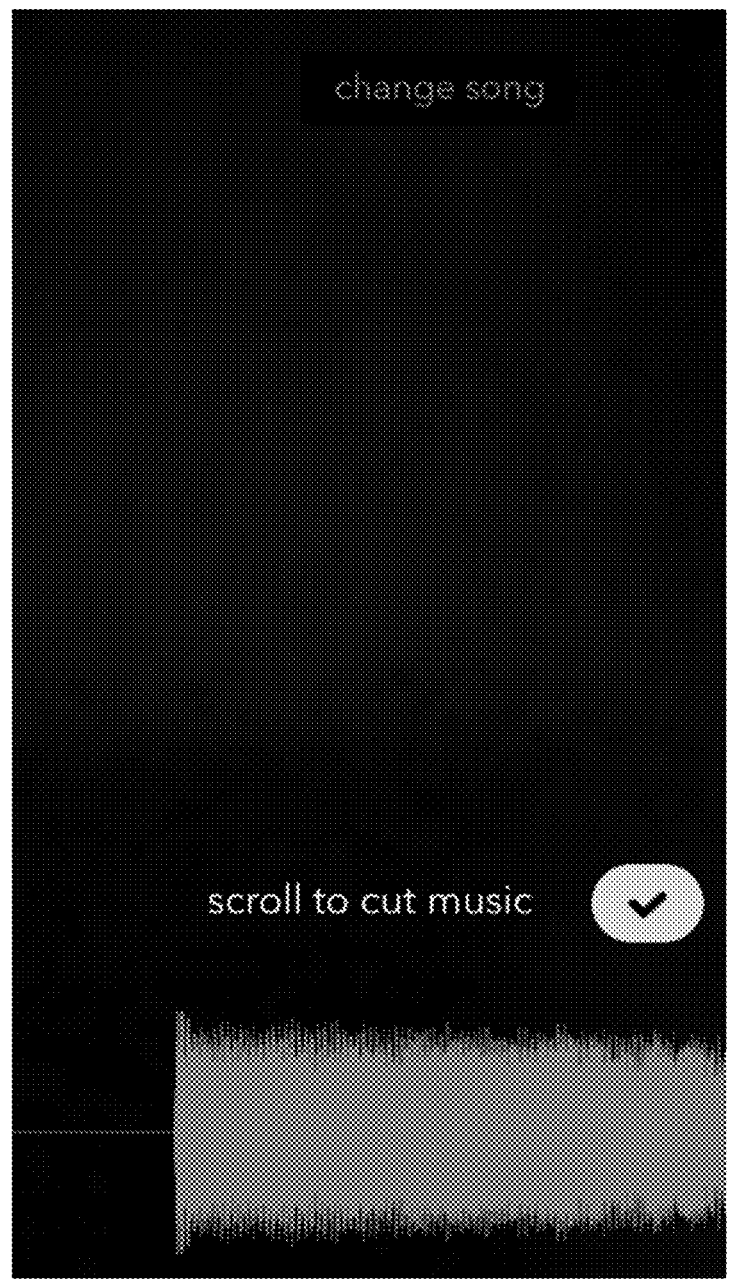
FIG. 21 shows a non-limiting example of an interface for the application described herein; in this case, an interface allowing a user to synchronize audio content with video content comprising tools allowing the user to scroll to cut the music and choose a start point.

In some embodiments, a software module is configured to present an interface allowing a user to synchronize the audio content with the video content comprises tools allowing the user to select a start point. In further embodiments, the start point is selected by the user via touchscreen wipe gesture. Referring to FIG. 21, in a particular embodiment, an interface is provided to allow a user to synchronize audio content with video content comprising tools allowing the user to scroll to cut the music and choose a start point. In some embodiments, a user cut the music by dragging wave form of the sound. In some embodiments, dragging the sound wave horizontally to select the corresponding sound clips, the visible part of the sound clip on the screen is the selected part. In some embodiments, once user release the finger on the screen, the selected part of the sound clip will be replayed.

Module for Generating Lip-Sync Videos

In some embodiments, the platforms, systems, media, and methods described herein include a module for generating lip-sync videos, or use of the same. In some embodiments, a software module is configured to synthesize the video content and the audio content to generate a new lip-sync video.

In some embodiments, software module configured to synthesize the video content and the audio content generates the lip-sync video on the digital processing device using the resources of the at least one processor and the memory. In some embodiments, a new lip-sync video is a music video, a dance video, a comedy video, a sports video, a fashion video, a make-up video, or a work-out video. In some embodiments, each lip-sync video is full screen. In further embodiments, the feed is browsed by the user via touchscreen wipe gesture. In further embodiments, floating action buttons are provided on full-screen music video. In further embodiments, transparent navigation bar is used on the feed page so that the navigation bar less distractive on a full-screen video.

In some embodiments, each lip-sync video is less than 20 seconds in length, less than 15 seconds in length, or less than 10 seconds in length. In some embodiments, each lip-sync video is less than 1 minute in length, less than 2 minutes in length, or less than 3 minutes in length.

In some embodiments, a user is allowed to keep a generated video private. In some embodiments, a user is allowed to share a generated video within a social networking media. Referring to FIG. 22, in a particular embodiment, an interface is provided to allow a user to choose to keep a recorded video private or post it on a social media platform.

Video Feed

In some embodiments, the platforms, systems, media, and methods described herein include a lip-sync video feed, or use of the same. In some embodiments, a lip-sync video feed is provided within the context of social network, the feed comprising a plurality of lip-sync videos, the feed identifying the author of each lip-sync video, the feed comprising tools to allow the user to comment on each lip-sync video and mark each lip-sync video as a favorite.

In some embodiments, a video feed is a featured content feed, a followed-user feed, or a location-based feed. In some embodiments, a featured content feed comprises creativity, originality, entertaining, and a combination of all three qualities. In some embodiments, a followed-user feed comprises videos are from the user's friends, followers, and users this user follows. In some embodiments, a location-based feed comprises videos near the location of the user. In some embodiments, a GPS location or similar services are provided to access a user's current location.

Referring to FIG. 1, in a particular embodiment, an interface is provided to present featured feed videos to a user. Referring to FIG. 2, in a particular embodiment, an interface is provided to present follow feed videos to a user. In some embodiments, a video feed is browsed by the user via touchscreen wipe gesture. Referring to FIG. 3, in a particular embodiment, an interface is provided to allow a user to browse and search videos. Referring to FIG. 12, in a particular embodiment, a process flow is described to show how users make lip-sync videos through the combination of audio content and video content and provide video feed to the server.

In some embodiments, feeds are sorted by the created time (or featured time for featured musicals). In some embodiments, feeds will start to pre-load once user landed on the feed page. In some embodiments, user can swipe up/down to browse the video feeds. In some embodiments, once user swipe up/down, it will navigate to the next/previous music video and the selected music video will start to loop.

In some embodiments, periodically, the app will detect if there is new content available for this user's feeds. If yes, it shows an "x new" indicator, and allows the user to click and refresh the feeds.

Duet Video

In some embodiments, the platforms, systems, media, and methods described herein include a module for creating a duet, or use of the same. In this case, a user does not have to be in the same place as another user to create a musical together. In some embodiments, a software module is configured to present an interface allowing a user to create a duet video, the interface comprising tools allowing the user to select a pre-existing lip-sync video, wherein the pre-existing lip-sync video is automatically integrated with captured video to create a new duet video. In further embodiments, the software module automatically transitions back and forth between the pre-existing lip-sync video and the captured video to integrate the two and create the new duet video.

Figure 26:
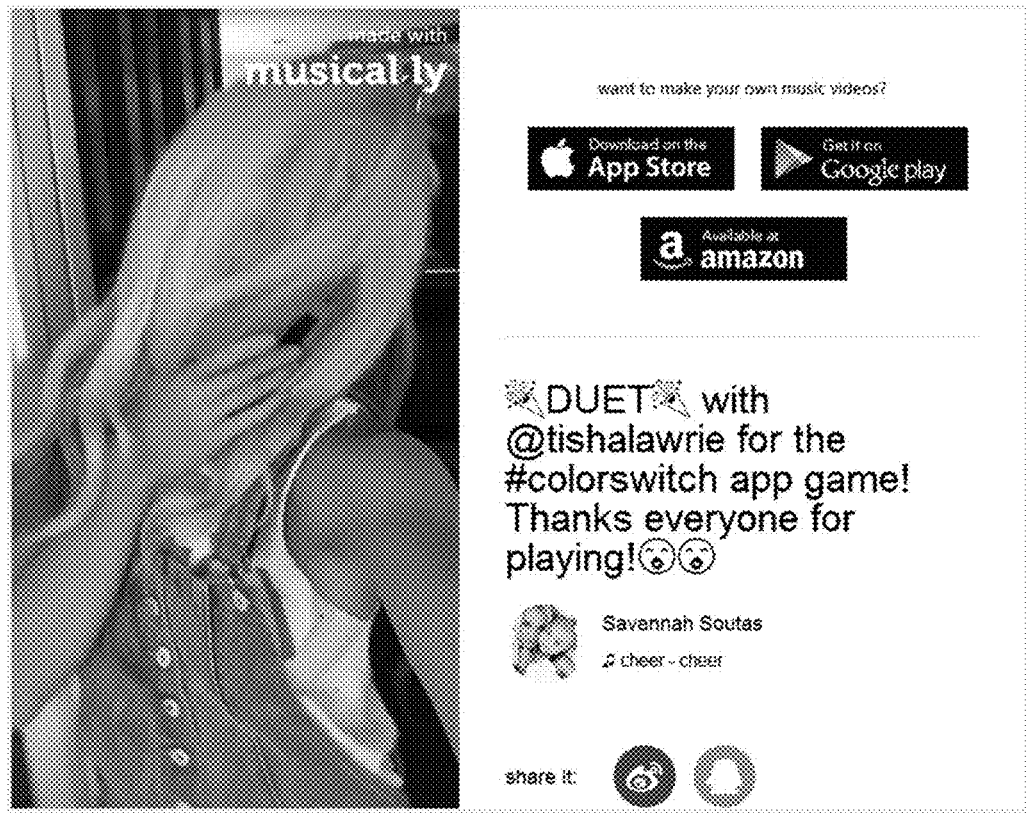
FIGS. 26 and 27 show non-limiting examples of an interface for the application described herein; in this case, an interface allowing a user to generate a duet video with another user.
Figure 27:
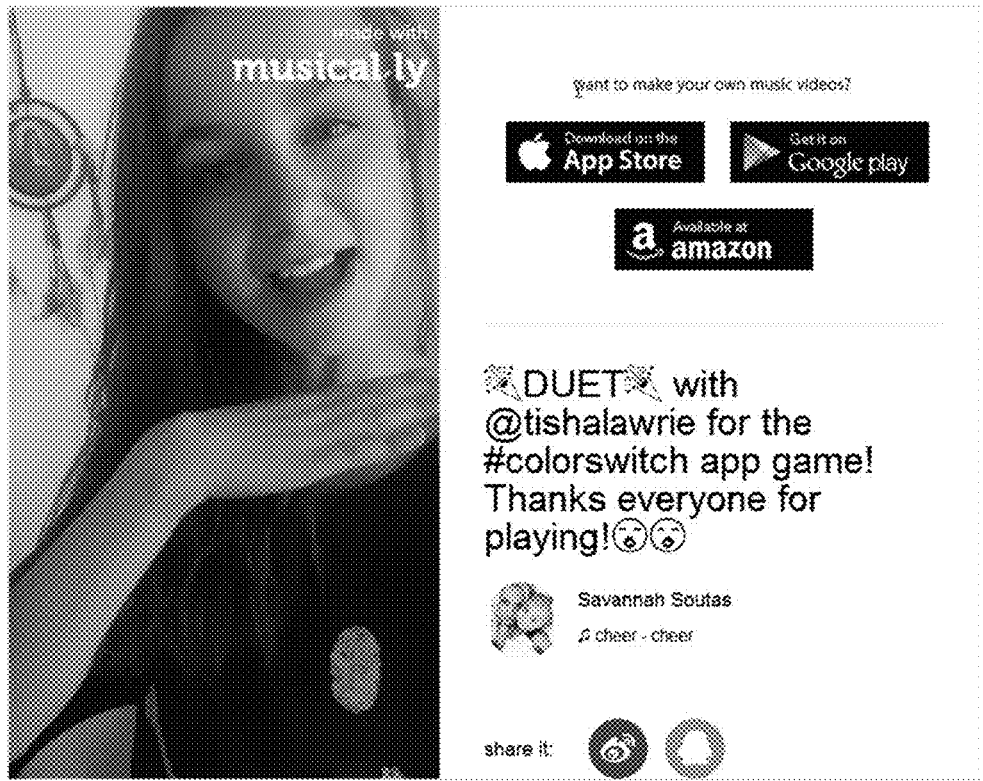

Referring to FIGS. 26-27, in particular embodiments, an interface is provided to allow a user to generate a duet video with another user. In some embodiments, the video segments of two duet users are intertwined with each other. In this case, for example, the two girls make a duet video like they are seamlessly talking and replying to each other.

In some embodiments, a duet is initiated by a first user when he selects the profile of someone he follows (and who follows him back); and press on the " . . . " icon on the musical screen; then, the user simply needs to press "start duet now!" and he is allowed to begin recording the duet. In some embodiments, a user and the person he wishes to create a duet with need already follow each other. In some other embodiments, a user is allowed to name one of his followers his "best fan forever" and lets them make a duet with him, without him needing to follow them.

Q&A

In some embodiments, the platforms, systems, media, and methods described herein include modules for conducting video Q&A, or use of the same. In some embodiments, a software module is configured to present an interface allowing a user to capture video content in response to a user question or comment.

Figure 28:
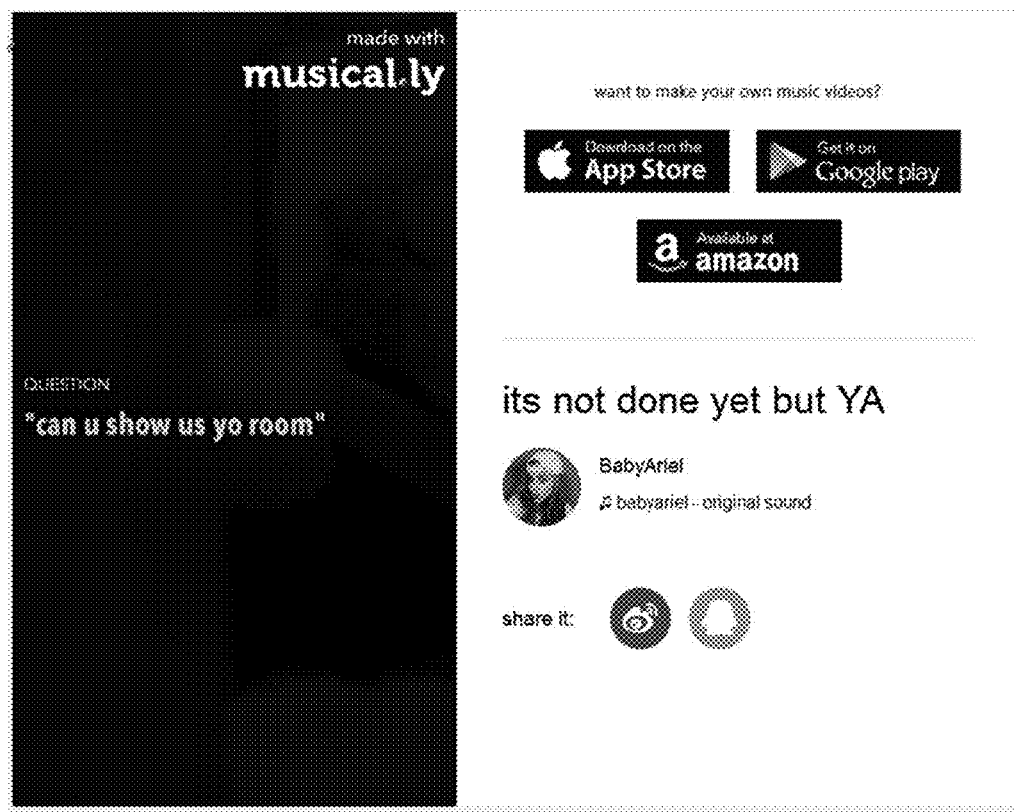
FIGS. 28 and 29 show non-limiting examples of an interface for the application described herein; in this case, an interface allowing a user to generate a Q&A video in response to other users' questions and comments.
Figure 29:
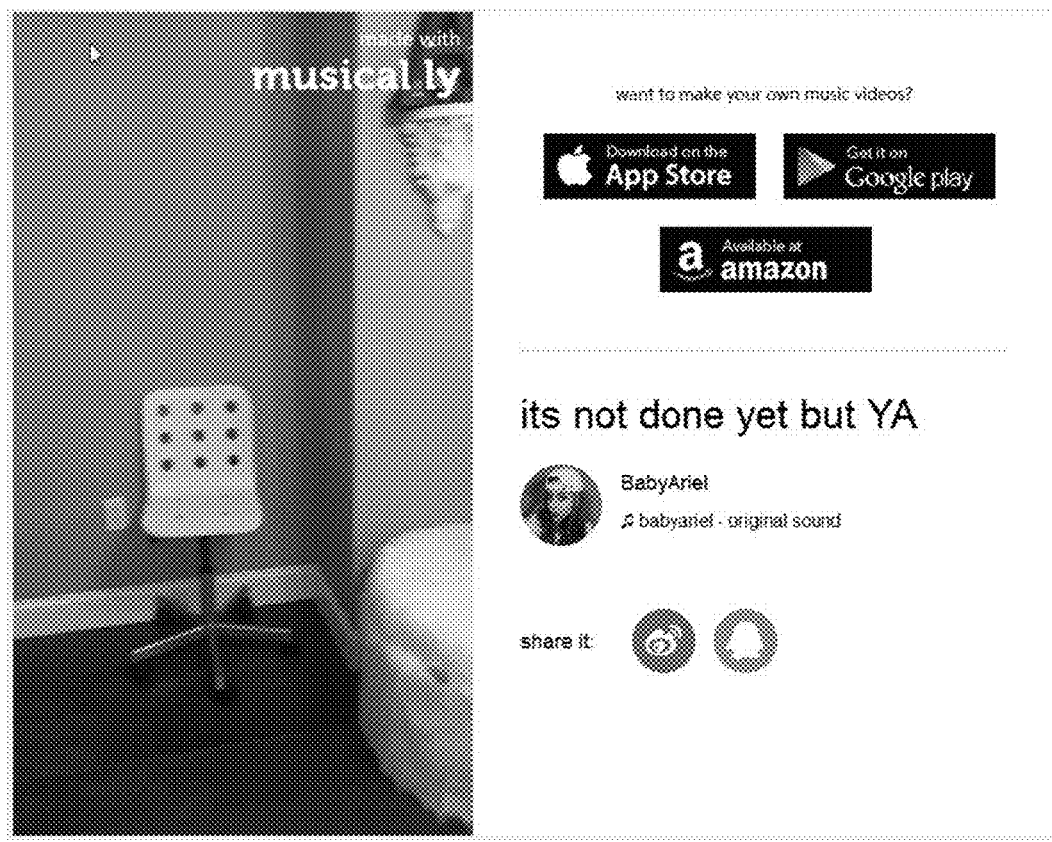

Referring to FIGS. 28-29, in particular embodiments, an interface is provided to allow a user to generate a Q&A video in response to other users' questions and comments. In this case, when a first user asks "can u show us yo room," the second user will generate a video showing his room in response to that question. In some embodiments, one Q&A segment is presented in one video. In some embodiments, two or more Q&A segments are presented in one video.

Challenges and Contests

In some embodiments, the platforms, systems, media, and methods described herein include modules for creating and participating in challenges and contests, or use of the same. In some embodiments, a software module is configured to present an interface allowing a user to create a challenge for other users to generate and upload lip-sync videos for one or more selected audio contents within a given time. In some embodiments, one or more winners are chosen for the best lip-sync videos and prizes are rewarded to the one or more winners. In some embodiments, a software module is configured to present an interface allowing a user to participate in challenges of generating lip-sync videos for a selected audio content. In some embodiments, a software module is provided to present reward prizes to one or more challenge winners.

Figure 25:
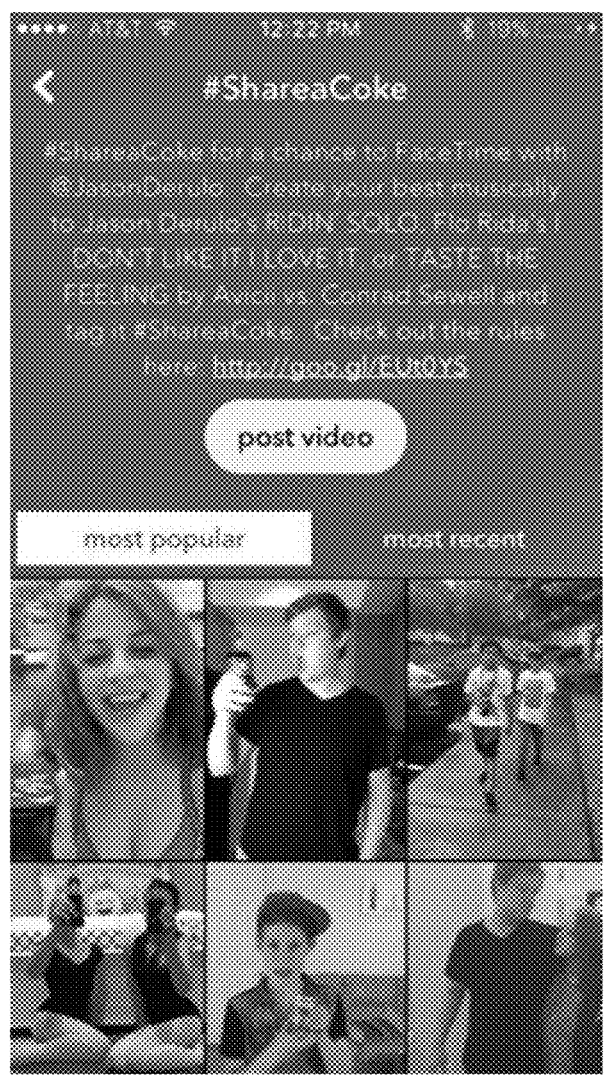
FIG. 25 shows a non-limiting example of an interface for the application described herein; in this case, an interface allowing a user to participate in a challenge to generate and upload lip-sync videos for one or more selected audio contents within a given time for a prize.

Referring to FIG. 25, in a particular embodiment, an interface is provided to allow a user to participate in a challenge to generate and upload lip-sync videos for one or more selected audio contents within a given time for a specified prize. In this case, a prize of a chance to FaceTime with a musician is provided for one or more challenge winners who post the best lip-sync videos for that musician's selected music audio contents. In some embodiments, one or more winners will be chosen for the best lip-sync videos uploaded by challenge participants. In further embodiments, winners are chosen based on energy, creativity, humor and overall talent, or any combinations thereof.

In some embodiments, a hashtag is named for the challenge. In some embodiments, most popular and most recent challenging videos are listed.

Live Moment

In some embodiments, the platforms, systems, media, and methods described herein include modules for live moment, or use of the same. In some embodiments, a user is presented a tool to generate and share a live moment within social networking media. As used herein, a "live moment" refers to a series of still images captured from video content at a rate slower than the frame rate of the original video. The result is stylized content more animated than a photograph, but with less detail and resolution than a video.

Figure 30:
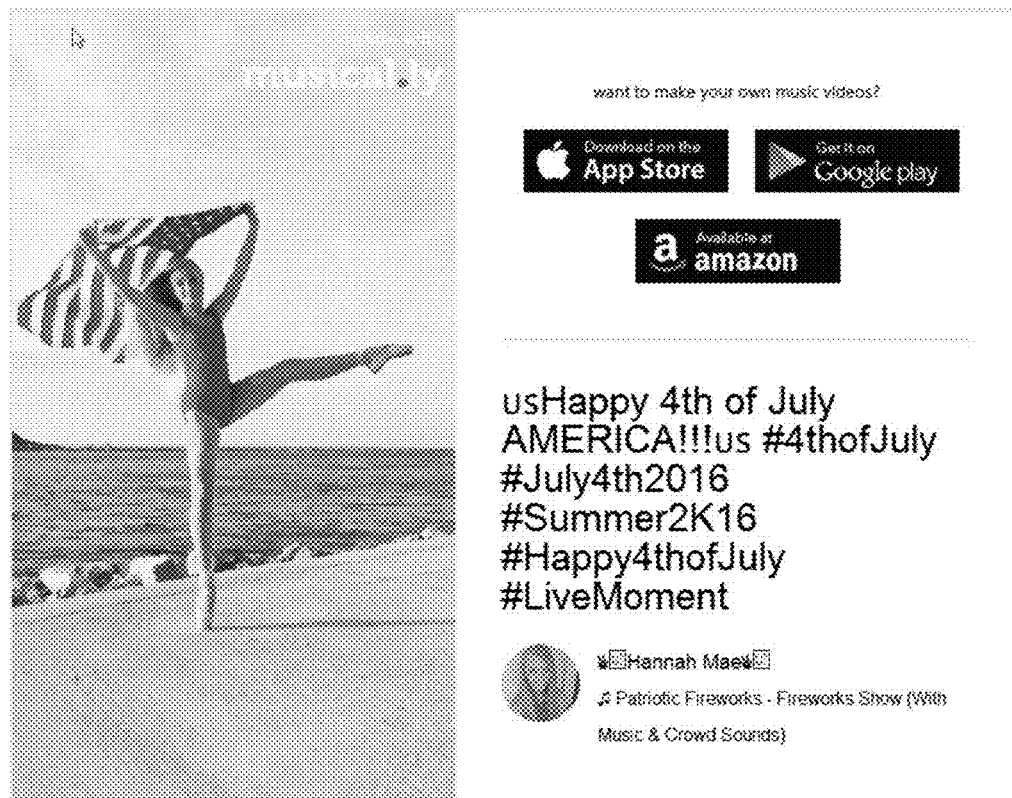
FIG. 30 shows a non-limiting example of an interface for the application described herein; in this case, an interface allowing a user to present live video on a social media platform.

Referring to FIG. 30, in a particular embodiment, an interface is provided to allow a user to present live video on a social media platform. In this case, while celebrating Fourth of July, the user presents live moment on social media showing her dancing with an American flag.

Shake for Music

In some embodiments, the platforms, systems, media, and methods described herein include modules for shaking for music, or use of the same. In some embodiments, a user is presented a tool to shake the phone and a random music video will be selected and looped.

Figure 31:
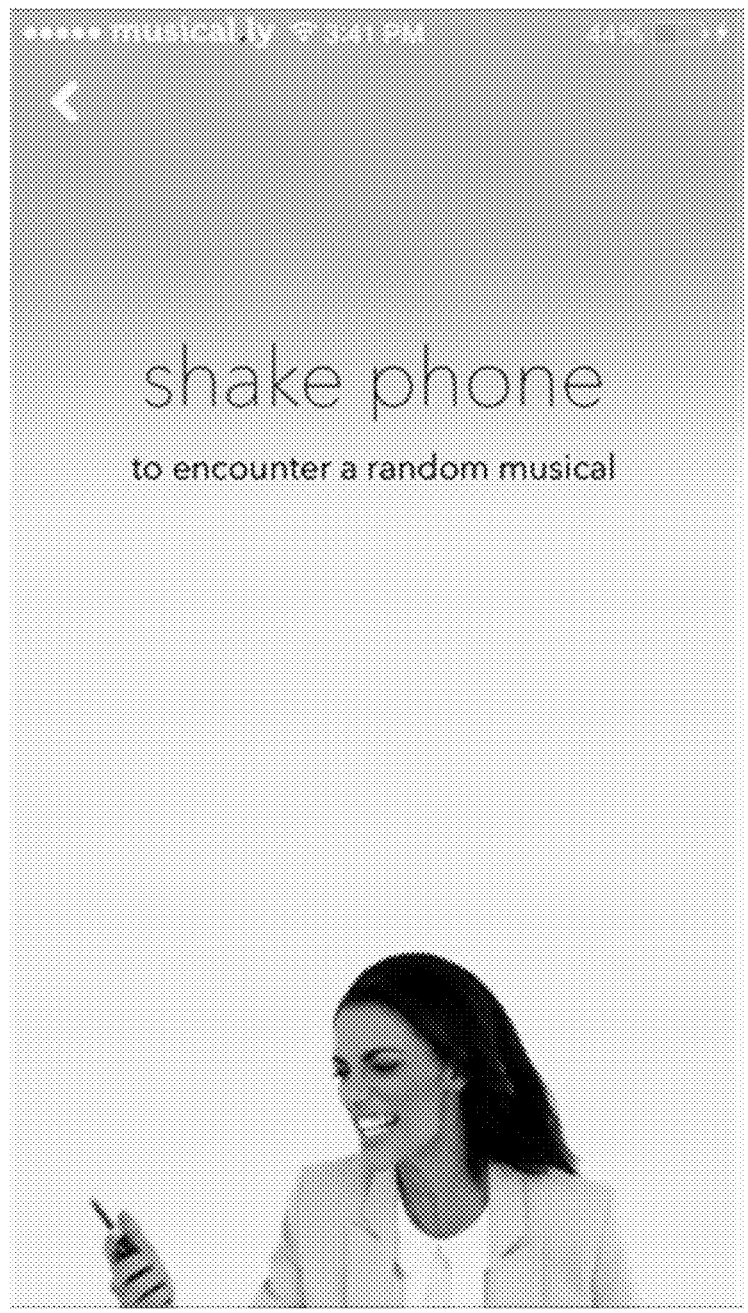
FIG. 31 shows a non-limiting example of an interface for the application described herein; in this case, an interface allowing a user to shake a phone once to get a random lip-sync video from all videos, wherein the chosen video will start to loop once it's been loaded.

Referring to FIG. 31, in a particular embodiment, an interface is provided to allow a user to shake a phone once to get a random lip-sync video from all videos, wherein the chosen video will start to loop once it's been loaded. When the user shakes the phone again, another random will be chosen and loaded.

Audio and Video Content Formats

In some embodiments, the platforms, systems, media, and methods described herein include digital audio and digital video, or use of the same. Many audio formats are suitable including, by way of non-limiting examples, MP3, WAV, AIFF, AU, Apple® Lossless, MPEG-4, Windows Media®, Vorbis, AAC, and Real Audio®. Many video formats are suitable including, by way of non-limiting examples, Windows® Media Video (WMV), Windows® Media®, Motion Picture Experts Group (MPEG), Audio Video Interleave (AVI), Apple® QuickTime®, RealMedia, Flash Video, Motion JPEG (M-JPEG), WebM, and Advanced Video Coding High Definition (AVCHD). In other embodiments, video is compressed. Both lossy and lossless video CODECs are suitable including, by way of non-limiting examples, DivX™, Cineform, Cinepak, Dirac, DV, FFV1, H.263, H.264, H.264 lossless, JPEG 2000, MPEG-1, MPEG-2, MPEG-4, On2 Technologies (VP5, VP6, VP7, and VP8), RealVideo, Snow lossless, Sorenson Video, Theora, and Windows Media Video (WMV). In some embodiments, video content is standard-definition. In other embodiments, video content is high-definition. In further embodiments, a high-definition image or video frame includes at least about 1280× about 720 pixels or at least about 1920× about 1080 pixels.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony®PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 32:
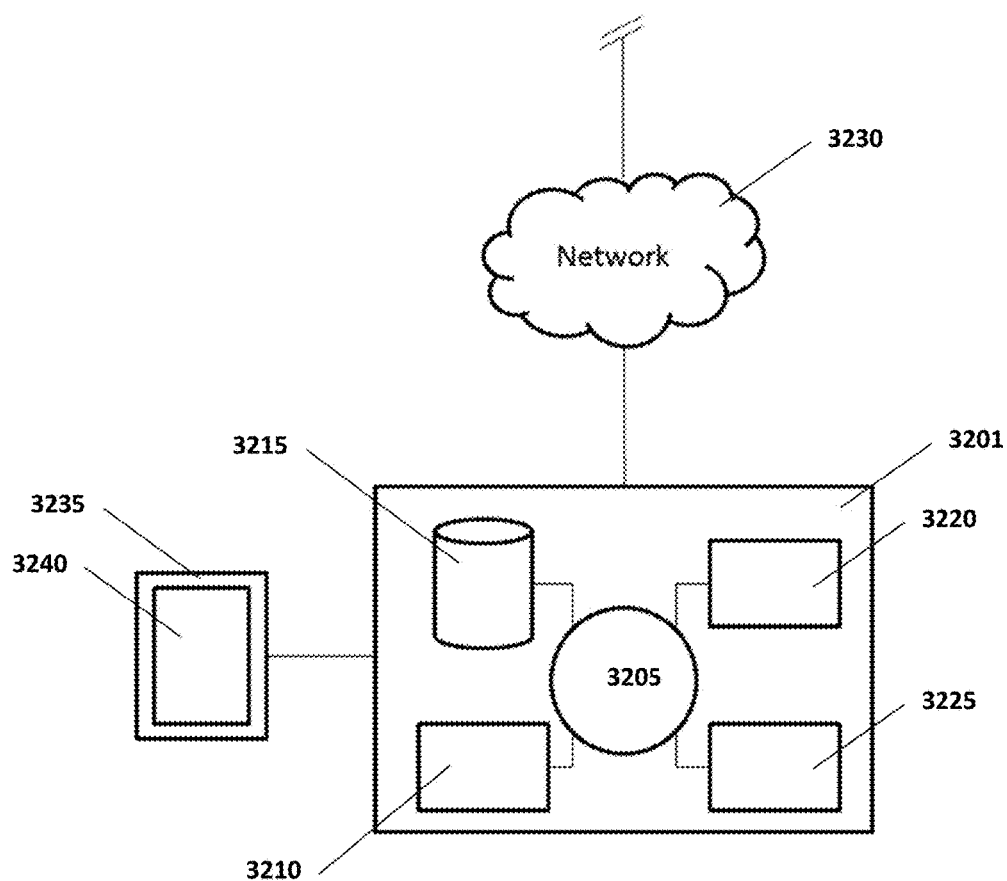
FIG. 32 shows a non-limiting example of a digital processing device; in this case, a device with one or more CPUs, a memory, a communication interface, and a display.

Referring to FIG. 32, in a particular embodiment, an exemplary digital processing device 3201 is programmed or otherwise configured to process user-generated video content with audio content to generate a music video. The device 3201 can regulate various aspects of video processing as described herein, such as, for example, integrating user-generated video content with pre-recorded influencer audio and video content to create a duet music video. In this embodiment, the digital processing device 3201 includes a central processing unit (CPU, also "processor" and "computer processor" herein) 3205, which can be a single core or multi core processor, or a plurality of processors for parallel processing. The digital processing device 3201 also includes memory or memory location 3210 (e.g., random-access memory, read-only memory, flash memory), electronic storage unit 3215 (e.g., hard disk), communication interface 3220 (e.g., network adapter) for communicating with one or more other systems, and peripheral devices 3225, such as cache, other memory, data storage and/or electronic display adapters. The memory 3210, storage unit 3215, interface 3220 and peripheral devices 3225 are in communication with the CPU 3205 through a communication bus (solid lines), such as a motherboard. The storage unit 3215 can be a data storage unit (or data repository) for storing data. The digital processing device 3201 can be operatively coupled to a computer network ("network") 3230 with the aid of the communication interface 3220. The network 3230 can be the Internet, an interne and/or extranet, or an intranet and/or extranet that is in communication with the Internet. The network 3230 in some cases is a telecommunication and/or data network. The network 3230 can include one or more computer servers, which can enable distributed computing, such as cloud computing. The network 3230, in some cases with the aid of the device 3201, can implement a peer-to-peer network, which may enable devices coupled to the device 3201 to behave as a client or a server.

Continuing to refer to FIG. 32, the CPU 3205 can execute a sequence of machine-readable instructions, which can be embodied in a program or software. The instructions may be stored in a memory location, such as the memory 3210. The instructions can be directed to the CPU 3205, which can subsequently program or otherwise configure the CPU 3205 to implement methods of the present disclosure. Examples of operations performed by the CPU 3205 can include fetch, decode, execute, and write back. The CPU 3205 can be part of a circuit, such as an integrated circuit. One or more other components of the device 3201 can be included in the circuit. In some cases, the circuit is an application specific integrated circuit (ASIC) or a field programmable gate array (FPGA).

Continuing to refer to FIG. 32, the storage unit 3215 can store files, such as drivers, libraries and saved programs. The storage unit 3215 can store user data, e.g., user preferences and user programs. The digital processing device 3201 in some cases can include one or more additional data storage units that are external, such as located on a remote server that is in communication through an intranet or the Internet.

Continuing to refer to FIG. 32, the digital processing device 3201 can communicate with one or more remote computer systems through the network 3230. For instance, the device 3201 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device 3201, such as, for example, on the memory 3210 or electronic storage unit 3215. The machine executable or machine readable code can be provided in the form of software. During use, the code can be executed by the processor 3205. In some cases, the code can be retrieved from the storage unit 3215 and stored on the memory 3210 for ready access by the processor 3205. In some situations, the electronic storage unit 3215 can be precluded, and machine-executable instructions are stored on memory 3210.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 33:
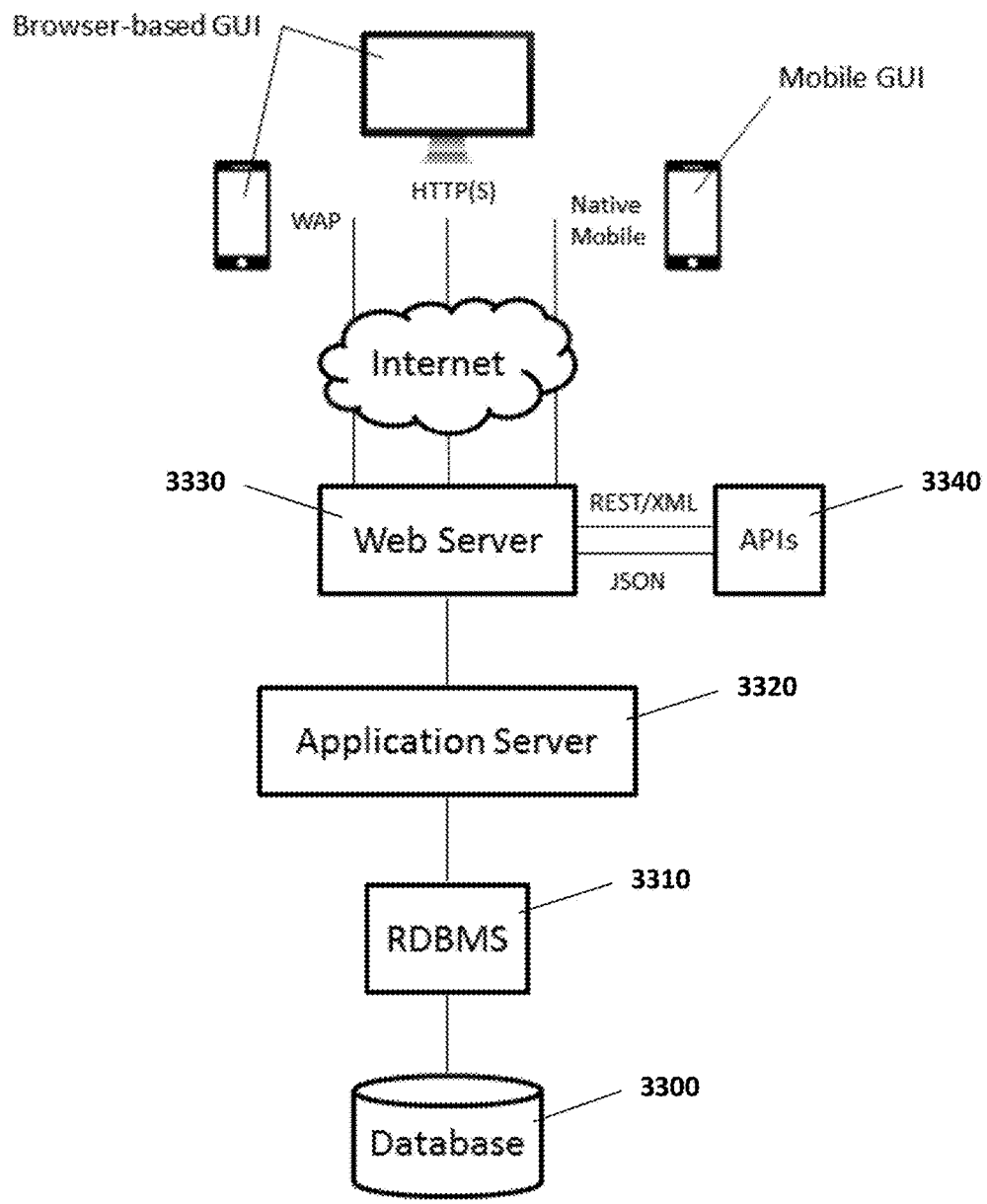
FIG. 33 shows a non-limiting example of a web/mobile application provision system; in this case, a system providing browser-based and/or native mobile user interfaces.

Referring to FIG. 33, in a particular embodiment, an application provision system comprises one or more databases 3300 accessed by a relational database management system (RDBMS) 3310. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 3320 (such as Java servers, NET servers, PHP servers, and the like) and one or more web servers 3330 (such as Apache, IIS, GWS and the like). The web server(s) optionally expose one or more web services via app application programming interfaces (APIs) 3340. Via a network, such as the Internet, the system provides browser-based and/or mobile native user interfaces.

Figure 34:
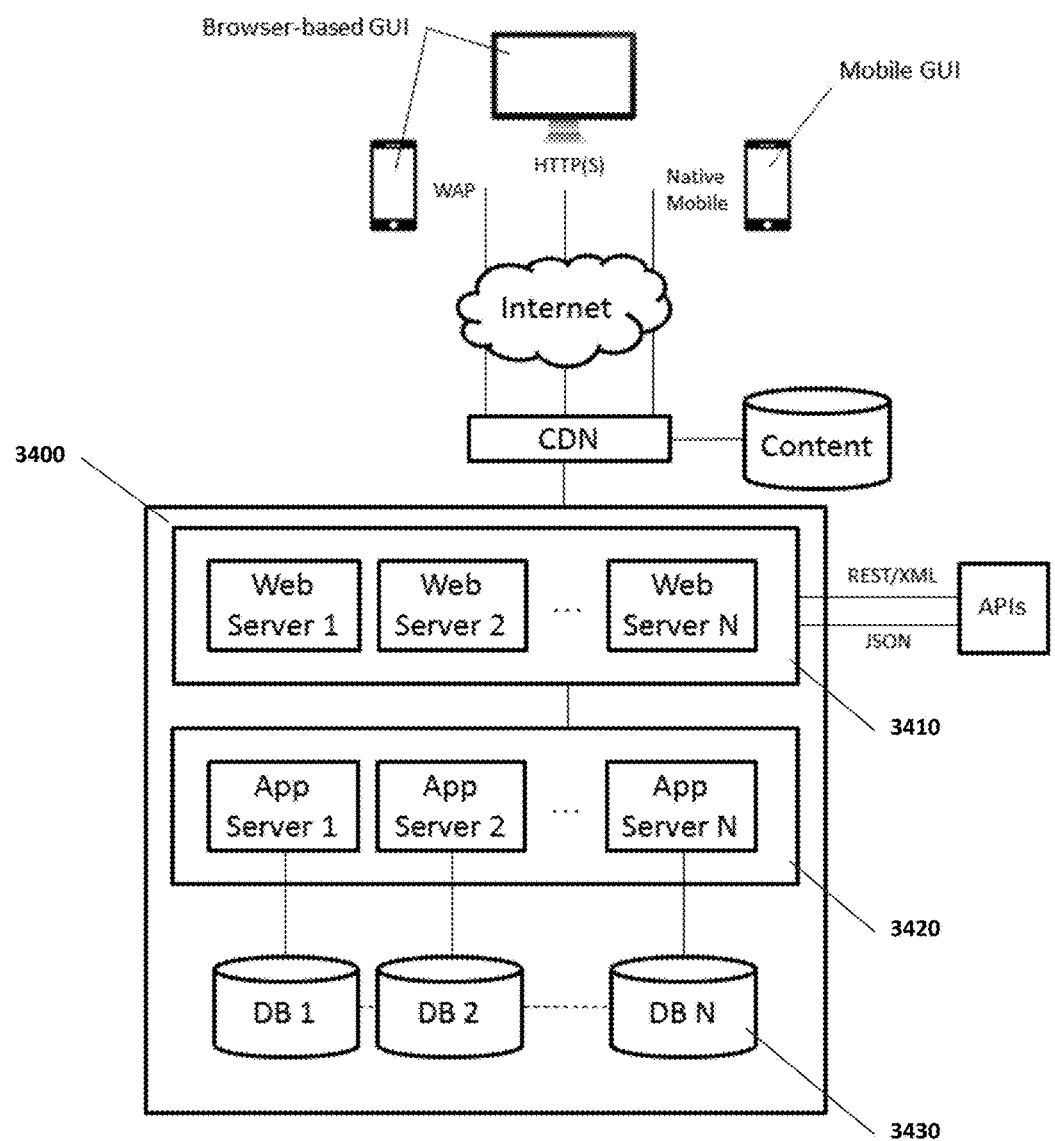
FIG. 34 shows a non-limiting example of a cloud-based web/mobile application provision system; in this case, a system comprising an elastically load balanced, auto-scaling web server and application server resources as well synchronously replicated databases.

Referring to FIG. 34, in a particular embodiment, an application provision system alternatively has a distributed, cloud-based architecture 3400 and comprises elastically load balanced, auto-scaling web server resources 3410 and application server resources 3420 as well synchronously replicated databases 3430.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user, music video, and social networking information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

What is claimed is:

1. A computer-implemented system comprising: a digital processing device comprising: at least one processor, an operating system configured to perform executable instructions, a memory, and a computer program including instructions executable by the digital processing device to create a video processing application for generating and sharing lip-sync videos comprising:
   a) a software module presenting an interface allowing a user to select audio content;
   b) a software module presenting an interface allowing a user to capture video content;
   c) a software module presenting an interface allowing a user to synchronize the audio content with the video content;
   d) a software module synthesizing the video content and the audio content to generate a new lip-sync video;
   e) a software module automatically sharing the lip-sync video to a social media platform; and
   f) a software module providing a lip-sync video feed within a social network, the feed comprising a plurality of lip-sync videos, the feed identifying the author of each lip-sync video, the feed comprising tools to allow the user to comment on each lip-sync video and mark each lip-sync video as a favorite.

2. The system of claim 1, wherein each lip-sync video is less than 20 seconds in length, less than 15 seconds in length, or less than 10 seconds in length.

3. The system of claim 1, wherein the interface allowing a user to select audio content allows the user to select audio content from: a streaming audio track, a pre-existing audio file archived on the digital processing device, and a pre-existing lip-sync video.

4. The system of claim 1, wherein the interface allowing a user to capture video content allows the user to capture video content from: a live video stream, a video captured in real-time using the digital processing device, or a pre-existing video file archived on the digital processing device.

5. The system of claim 1, wherein the interface allowing a user to select audio content comprises tools allowing the user to edit the audio content.

6. The system of claim 5, wherein the editing comprises modification of the speed of the audio content, modification of one or both of the end points of the audio content, and modification of the volume of the audio content.

7. The system of claim 5, wherein the editing comprises mixing the audio content with one or more distinct audio contents.

8. The system of claim 1, wherein the interface allowing a user to capture video content comprises tools allowing the user to edit the video content.

9. The system of claim 8, wherein the editing comprises modification of the speed of the video content and application of one or more color filters to the video content.

10. The system of claim 1, wherein the feed is a featured content feed, a followed-user feed, or a location-based feed.

11. The system of claim 1, wherein the user selects audio prior to capturing video.

12. The system of claim 1, wherein the user captures video prior to selecting audio.

13. The system of claim 1, wherein the software module presenting an interface allowing a user to synchronize the audio content with the video content comprises tools allowing the user to select a start point.

14. The system of claim 13, wherein the start point is selected by the user via touchscreen wipe gesture.

15. The system of claim 1, wherein the software module synthesizing the video content and the audio content generates the lip-sync video on the digital processing device using the resources of the at least one processor and the memory.

16. The system of claim 1, wherein the application further comprises a software module presenting an interface allowing a user to create a duet video, the interface comprising tools allowing the user to select a pre-existing lip-sync video, wherein the pre-existing lip-sync video is integrated with captured video to create a new duet video.

17. The system of claim 1, wherein the application further comprises a software module presenting an interface allowing a user to capture video content in response to a user comment.

18. The system of claim 1, wherein the new lip-sync video is a music video, a dance video, a comedy video, a sports video, a fashion video, a make-up video, or a work-out video.

19. The system of claim 1, wherein each lip-sync video is full screen.

20. The system of claim 19, wherein the feed is browsed by the user via touchscreen wipe gesture.

21. The system of claim 1, wherein the application further comprises a software module presenting an interface allowing a user to create a challenge for other users to generate and upload lip-sync videos for one or more selected audio contents within a given time.

22. The system of claim 21, wherein one or more winners are chosen for the best lip-sync videos and prizes are rewarded to the one or more winners.

23. The system of claim 1, wherein the application further comprises a software module presenting an interface allowing a user to participate in challenges of generating lip-sync videos for a selected audio content.

24. Non-transitory computer-readable storage media encoded with a computer program including instructions executable by a processor to create a video processing application for generating and sharing lip-sync videos comprising:
  a. a software module presenting an interface allowing a user to select audio content;
  b. a software module presenting an interface allowing a user to capture video content;
  c. a software module presenting an interface allowing a user to synchronize the audio content with the video content;
  d. a software module synthesizing the video content and the audio content to generate a new lip-sync video;
  e. a software module automatically sharing the lip-sync video to a social media platform; and
  f. a software module providing a lip-sync video feed within a social network, the feed comprising a plurality of lip-sync videos, the feed identifying the author of each lip-sync video, the feed comprising tools to allow the user to comment on each lip-sync video and mark each lip-sync video as a favorite.

25. A computer-implemented method of a video processing to generate and share lip-sync videos comprising:
  a. presenting, by a computer, an interface allowing a user to select audio content;
  b. presenting, by the computer, an interface allowing a user to capture video content;
  c. presenting, by the computer, an interface allowing a user to synchronize the audio content with the video content;
  d. synthesizing, by the computer, the video content and the audio content to generate a new lip-sync video;
  e. automatically sharing, by the computer, the lip-sync video to a social media platform; and
  f. providing, by the computer, a lip-sync video feed within a social network, the feed comprising a plurality of lip-sync videos, the feed identifying the author of each lip-sync video, the feed comprising tools to allow the user to comment on each lip-sync video and mark each lip-sync video as a favorite.

* * * * *

UNITED STATES PATENT AND TRADEMARK OFFICE
CERTIFICATE OF CORRECTION

PATENT NO. : 9,583,142 B1  
APPLICATION NO. : 15/207403  
DATED : February 28, 2017  
INVENTOR(S) : Zhu et al.

Page 1 of 1

It is certified that error appears in the above-identified patent and that said Letters Patent is hereby corrected as shown below:

On the Title Page

Item (73) Assignee: please delete "MUSICALLY INC." and replace with --MUSICAL.LY INC.--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*